United States Patent
Sadler et al.

(10) Patent No.: US 12,407,885 B2
(45) Date of Patent: Sep. 2, 2025

(54) ADAPTIVE CONTENT COMPOSITE GENERATION AND CONTROL

(71) Applicant: DISH Network L.L.C., Englewood, CO (US)

(72) Inventors: Robert Sadler, Denver, CO (US); Timothy Meyer, Denver, CO (US); Christopher Kuhrt, Englewood, CO (US); Jesse Montgomery, Denver, CO (US); Shaun Ryan, Colorado Springs, CO (US)

(73) Assignee: DISH Network L.L.C., Englewood, CO (US)

( * ) Notice: Subject to any disclaimer, the term of this patent is extended or adjusted under 35 U.S.C. 154(b) by 2 days.

(21) Appl. No.: 17/505,393

(22) Filed: Oct. 19, 2021

(65) Prior Publication Data
US 2023/0118189 A1 Apr. 20, 2023

(51) Int. Cl.
*H04N 21/258* (2011.01)
*H04N 21/2665* (2011.01)
*H04N 21/845* (2011.01)

(52) U.S. Cl.
CPC ... *H04N 21/25841* (2013.01); *H04N 21/2665* (2013.01); *H04N 21/8455* (2013.01)

(58) Field of Classification Search
None
See application file for complete search history.

(56) References Cited

U.S. PATENT DOCUMENTS

| 9,288,539 B2 | 3/2016 | Johnson | |
|---|---|---|---|
| 2008/0066111 A1 | 3/2008 | Ellis et al. | |
| 2011/0287825 A1 | 11/2011 | Hoover | |
| 2013/0007191 A1* | 1/2013 | Klappert | H04N 21/25866 709/217 |
| 2018/0304146 A1 | 10/2018 | Dayal et al. | |
| 2018/0359506 A1* | 12/2018 | Hodge | H04L 65/70 |
| 2019/0158787 A1 | 5/2019 | Pino, Jr. et al. | |
| 2019/0273954 A1* | 9/2019 | Evans | H04N 21/25883 |
| 2020/0357246 A1 | 11/2020 | Nelson et al. | |

(Continued)

FOREIGN PATENT DOCUMENTS

| EP | 3691286 A1 * | 8/2020 | H04N 21/23418 |
|---|---|---|---|
| WO | WO-2017079778 A1 * | 5/2017 | A63B 71/0605 |
| WO | WO-2020251533 A1 * | 12/2020 | H04N 21/2146 |

*Primary Examiner* — Jason K Lin
(74) *Attorney, Agent, or Firm* — Kilpatrick Townsend & Stockton LLP

(57) ABSTRACT

Systems, methods, and machine-readable media to facilitate adaptive content composite generation with respect to digitally distributed content are disclosed. Observation data corresponding to detected media device operations associated with media devices in a particular geolocation may be processed and mapped to events. An identifier of a particular event may be selected based on the observation data, and a content composite corresponding to the particular event may be created. An adaptable content object may be identified based on the observation data and may be configured with a content object. The content composite may be output for presentation so that the endpoint media device performs operations relating to the content composite. Signals corresponding to the operations triggered by the content composite and indicative interface options may be processed.

20 Claims, 10 Drawing Sheets

(56) References Cited

U.S. PATENT DOCUMENTS

| | | |
|---|---|---|
| 2021/0056750 A1 | 2/2021 | Rowley |
| 2021/0076099 A1 | 3/2021 | Ganschow et al. |
| 2022/0103905 A1 | 3/2022 | Montgomery et al. |
| 2022/0157127 A1* | 5/2022 | Tadepalli ............ G07F 17/3288 |
| 2022/0377427 A1 | 11/2022 | Montgomery et al. |

* cited by examiner

ADAPTIVE CONTENT COMPOSITE GENERATION AND CONTROL

This disclosure generally relates to content corresponding to televised and streamed events, and more particularly to adaptive content composite generation and control.

BACKGROUND

Users of televisions and other video distribution platforms are now exposed to more varying types of content than ever before. However, with the proliferation of different content corresponding to televised and streamed events, a viewer can encounter a number of difficulties. The difficulties can include system performance deficiencies, as well as the amount of time and effort necessary to search for and interact with various systems providing content corresponding to events viewed via the platforms. The process of locating and interacting with optimal content features can be difficult, inefficient, and limited. Viewers are in need of better viewer experiences and interactive features.

Thus, there is a need for systems, methods, and processor-readable media that address the foregoing problems in order. This and other needs are addressed by the present disclosure.

BRIEF SUMMARY

Certain embodiments of the present disclosure relate generally to content corresponding to televised and streamed events, and more particularly to adaptive content composite generation and control.

In one aspect, a system to facilitate adaptive content composite generation with respect to digitally distributed content corresponding to an event is disclosed. The system may include one or more processing devices and memory communicatively coupled with and readable by the one or more processing devices and having stored therein processor-readable instructions which, when executed by the one or more processing devices, cause the one or more processing devices to perform operations. In another aspect, a method for adaptive content composite interaction with respect to digitally distributed content corresponding to an event is disclosed. In yet another aspect, one or more non-transitory, machine-readable media is disclosed as having machine-readable instructions thereon which, when executed by one or more processing devices, cause the one or more processing devices to perform operations. The operations and steps of the system, method, and non-transitory, machine-readable media may include one or a combination of the following. A set of one or more electronic communications received via one or more interfaces may be detected. One or more signals of one or more events that are specified for digital distribution from a set of one or more events may be detected from the set of one or more electronic communications. A set of observation data corresponding to indications of detected media device operations associated with a set of one or more media devices in a particular geolocation may be processed and mapped to the set of one or more events. An identifier of a particular event of the set of one or more events may be selected based at least in part on the set of observation data. A content composite corresponding to the particular event may be created. An adaptable content object corresponding to the particular event may be identified based at least in part on the set of observation data. A content object received by the one or more processing devices from a system that is remote from the one or more processing devices may be processed. The adaptable content object may be configured with the content object so that the content composite causes presentation of the adaptable content object adapted with the content object for at least part of a presentation time when the content composite is presented. The content composite may be output for presentation where, consequent to providing the content composite to an endpoint media device, the endpoint media device performs at least one operation relating to the content composite. At least one signal corresponding to the at least one operation relating to the content composite that is triggered by the content composite and that is indicative of activation of an interface option caused by the content composite may be processed.

In various embodiments, the set of observation data may correspond to indications of detected media device operations associated with a plurality of media devices in the particular geolocation. In various embodiments, the set of observation data may correspond to indications of detected media device operations associated with a particular endpoint identifier. In various embodiments, the detected media device operations may include one or more previous interactions with one or more previous content composites. In various embodiments, the detected media device operations may include one or more previous operational settings of the media device. In various embodiments, the creating the content composite may be a function of the current geolocation of the media device and a set of rules mapped to the current geolocation. In various embodiments, one or both of the adaptable content object and the content object may be identified as a function of a current geolocation mapped to a media device associated with the particular endpoint identifier.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
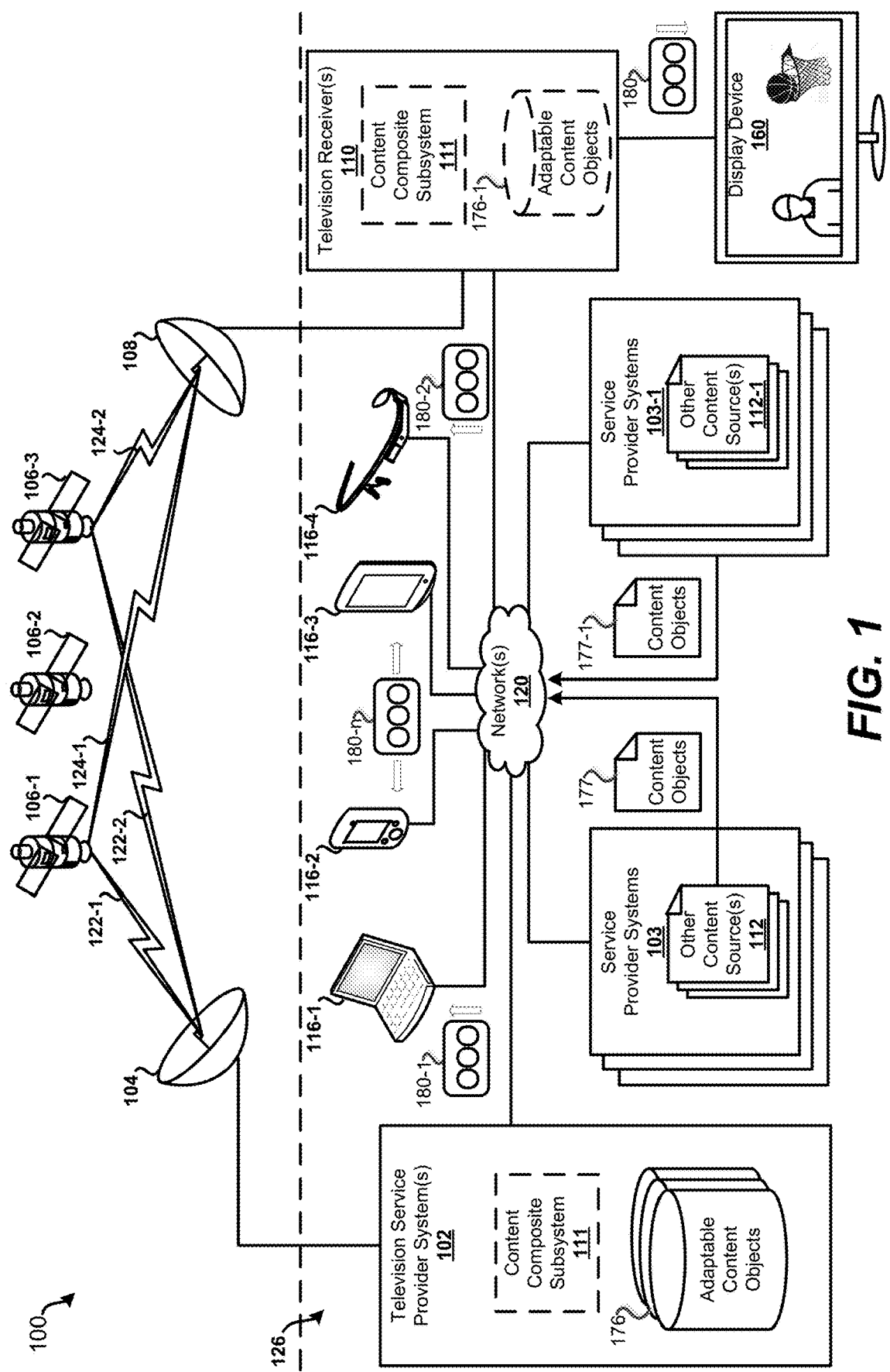
FIG. 1 illustrates a content distribution system, in accordance with disclosed embodiments per the present disclosure.

FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

The system 100 may include content television service provider system 102 (e.g., a television service provider system), satellite uplink 104, a plurality of orbiting (e.g., geosynchronous) satellites 106, satellite receiver 108, one or more television receivers 110, one or more content sources 112 (e.g., online content sources), computing devices 116-1, 116-2, 116-3, 116-4 (referenced generally herein with 116), and service provider systems 103. In some embodiments, each of the television receivers 110 may include a content composite subsystem 111. Additionally or alternatively, the content provider 102 may include a content composite subsystem 111 in whole or in part. Additionally or alternatively, one or more service provider systems 103 may include a content composite subsystem 111 in whole or in part. Additionally or alternatively, one or more computing devices 116 may include a content composite subsystem 111 in whole or in part. The content composite subsystem 111 may be configured to facilitate various content composite generation/control features in accordance with various embodiments disclosed herein. The extent to which the media devices 116 may be configured to provide features of the subsystem 111 (e.g., by way of software updates and communications from the system 102-1) may depend on the processing power and storage capabilities of a given device 116. The system 102-1 may communicate with a given device 116 to pull specifications and current device capability information from the device 116. Based on such communications, the system 102-1 may the extent to which the device 116 can be configured to provide features of the subsystem 111 and may operate accordingly. For example, the system 102-1 may push one or more software packages to the device 116 to configure the device 116 to provide a set of one or more features of the subsystem 111. In instances where the device 116 lacks sufficient processing and/or storage capabilities, the subsystem 111 may operate on the system 102-1. As one example with respect to many features disclosed herein, the filtering of composites 180 may be performed on the backend at system 102-1 when the device 116 lacks sufficient resources to perform the filtering itself. Further, in some embodiments, additionally or alternatively, one or more service provider systems 103-1 may include a content composite subsystem 111 in whole or in part. The content composite subsystem 111 may be configured to facilitate various content adaptation features in accordance with various embodiments disclosed herein.

In general, the system 100 may include a plurality of networks 120 that can be used for bi-directional communication paths for data transfer between components of system 100. Disclosed embodiments may transmit and receive data, including video content, via the networks 120 using any suitable protocol(s). The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous)

satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

Many embodiments may include a large number of content provider systems 102, data source systems 103, and/or such media devices. The content provider systems 102 may distribute broadcast video content to the endpoint devices 116 and receivers 110 via one or more networks of the networks 120. For example, a content provider system 102 may be configured to stream, via the networks 120, television channels, live sporting events and other competitions, on-demand programming, movies, other shows, television programs or portions of television programs following and/or during a live broadcast of the television programs, announcement content and commercials, programming information (e.g., table data, electronic programming guide (EPG) content, etc.), and/or other services to endpoint devices 116 and receivers 110 via satellite, 5G, 4G, and/or LTE wireless communication protocols and network components, in accordance with embodiments disclosed herein. The content provider system 102 may include one or more content server systems configured to stream television programming, including televised events such as sports events, to the computing devices 116 via the network 120. When the streaming content servers stream content to the computing devices 116, the stream content may be processed and displayed by the computing devices 116 using one or more applications installed on the computing devices 116. Some such streaming services may require a subscription and may require user authentication, e.g., with a username and/or password which may or may not be associated with an account map to the television receiver 110. Accordingly, the streaming services may make a television program available for streaming or download during the live broadcast of the television program.

The content provider system 102 may include one or more adaptable content object repositories 176. The content provider system 102 may store adaptable content objects in a repository 176. The one or more adaptable content object repositories 176 may be implemented in various ways. For example, one or more data processing systems may store adaptable content objects. One or more relational or object-oriented databases, or flat files on one or more computers or networked storage devices, may store adaptable content objects. In some embodiments, a centralized system stores adaptable content objects; additionally or alternatively, a distributed/cloud system, network-based system, such as being implemented with a peer-to-peer network, or Internet, may store adaptable content objects.

Content objects 176 and/or content object objects 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the adaptable content objects 176 may correspond to visual and/or audiovisual announcements with graphical and/or audio components particularized to certain types of services. In some embodiments, the announcements may correspond to commercials to be presented during commercial breaks of television programming, such as televised events, and/or streamed events. In some instances, the content objects 176 may be sourced by one or more of the service provider systems 103. In some embodiments, the adaptable content objects 176 may correspond to video and/or audio video file structures with one or more transition points, hooks, frames, windows, and/or the like for merging with one or more particularized content objects, content objects 177, particularized to certain services (e.g., services of online gambling/betting platforms, content, and features) of the service provider systems 103. As disclosed herein, the adaptable content objects 176 may be merged, blended, joined, overlaid, customized, and/or the like in any suitable manner with other particularized content objects 177 in order to create electronic content composites 180 particularized to certain types of services. In various embodiments, as further disclosed herein, the adaptable content objects 176 and/or the other content objects are adjusted and/or otherwise prepared to facilitate the merging, blending, joining, overlaying, customizing, and/or the like and insertion into a content stream as disclosed further herein.

In some embodiments, the content provider system 102 may provide the adaptable content objects 176 and, in some embodiments, the particularized content objects 177, to the devices 116 via one or more of the networks 120. Additionally or alternatively to providing the adaptable content objects 176 and/or particularized content objects 177, the content provider system 102 may provide content composites 180 to the television receiver 110 through such means. In some embodiments, the content provider system 102 may provide the adaptable content objects 176 and, in some embodiments, the particularized content objects 177, to the television receiver 110 as part of a data transfer that is sent through the satellite 106. For example, in some embodiments, the television receiver 110 may receive a downlinked satellite signal that includes the data for adaptable content objects 176 and/or particularized content objects 177 transferred on a designated line in the vertical blanking interval (VBI) or other portion of the broadcast service communication that does not interfere with other transmitted content. Additionally or alternatively, the content provider 102 may provide adaptable content objects 176 and/or particularized content objects 177 to the television receiver 110 via the one or more data networks 120. The television receiver 110 may store the adaptable content objects 176 and/or particularized content objects 177 in an adaptable content object 176 repository and/or a particularized content objects 177 repository included in the television receiver 110 or otherwise local to the television receiver 110. Consequently, the television receiver 110 may use one or more of the adaptable content objects 176 and one or more of the particularized content objects 177 to create electronic content composites 180 in accordance with embodiments disclosed herein. Additionally or alternatively to providing the adaptable content objects 176 and/or particularized content objects 177, the content provider system 102 may provide content composites 180 to the television receiver 110 through such means.

The content provider system 102 and satellite transmitter equipment (which may include the satellite uplink 104) may be operated by a content provider. A content provider may distribute television channels, on-demand programing, programming information, and/or other services to users via satellite and one or more of the networks 120. The content provider system 102 may receive feeds of such content from various sources. The television channels may include multiple television channels that contain the same content (but may be in different formats, such as high-definition and standard-definition). To distribute such video content to endpoint devices 116, feeds of the video content may be relayed to endpoint equipment and the endpoint devices 116 via one or more satellites in the form of transponder streams. Satellite transmitter equipment may be used to transmit a feed of one or more television channels from the content provider system 102 to one or more satellites 106. While a single content provider system 102 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

The data source systems 103 may correspond to any suitable sources of data such as one or more computer systems, databases, websites, portals, any repositories of data in any suitable form, server systems, other endpoint devices like endpoint devices 116 but functioning as data sources, and/or the like. In some instances, the data source systems 103 may include one or more mobile computing device locator services that provide information regarding the location of one or more of the endpoint devices 116 and/or the adaptive routers 110. In various instances, the data source systems 103 may provide various details relating to IP addresses, cellular tower identification and location data, mobile device triangulation data, LAN identification data, Wi-Fi identification data, access point identification and location data, and/or the like data that facilitates location of one or more of the endpoint devices 116 and/or the adaptive routers 110.

In various embodiments, the data from one or more of the data source systems 103 may be retrieved and/or received by a content provider system 102 via one or more data acquisition interfaces through network(s) 120 and/or through any other suitable means of transferring data. In various embodiments, the content provider system 102 the data source systems 103 could use any suitable means for direct communication. In various embodiments, the content provider system 102 may actively gather and/or pull from one or more of the data source systems 103. Additionally or alternatively, the content provider system 102 may wait for updates from one or more of the data source systems 103. The data collected (location data, IP address, content objects 177, etc.) may be curated so that only the data necessary for the transaction is collected. The one or more data acquisition interfaces may include one or more application programming interfaces (APIs) that define protocols and routines for interfacing with the data source systems 103. The APIs may specify application programming interface (API) calls to/from data source systems 103. In some embodiments, the APIs may include a plug-in to integrate with an application of a data source systems 103. The data acquisition interfaces, in some embodiments, could use a number of API translation profiles configured to allow interface with the one or more additional applications of the data sources to access data (e.g., a database or other data store) of the data source systems 103. The API translation profiles may translate the protocols and routines of the data source systems 103 to integrate at least temporarily with the system and allow communication with the system by way of API calls.

The television receivers 110, as described throughout, may generally be any type of television receiver (such as an STB (set-top box), for example) configured to decode signals received for output and presentation via a display device 160. In another example, television receiver 110 (which may include another remote television receiver 110) may be integrated as part of or into a television, a DVR, a computing device, such as a tablet computing device, or any other computing system or device, as well as variations thereof. In some embodiments, a television receiver 110 may be a component that is added into the display device 160, such as in the form of an expansion card. A television receiver 110 and network 120 together with television receivers 110 and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 160, computing devices 116, etc. are illustrated in FIG. 1, it should be understood that multiple (e.g., tens, thousands, millions) instances of such equipment, corresponding to various users in various geolocations, may be included the system 100.

In some embodiments, broadcast televised events may be delivered to television receivers, including a television receiver 110, via satellite according to a schedule. On-demand content may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by content provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the content provider 102 via the satellites 106. For example, the satellite receiver 108 may be configured to receive particular transponder streams as downlink signals 124, from one or more of the satellites 106. Based at least in part on the characteristics of a given television receiver 110 and/or satellite receiver 108, it may only be possible to capture transponder streams from a limited number of transponders of the satellites 106 concurrently. For example, a tuner of the television receiver 110 may only be able to tune to a single transponder stream from a transponder of a single satellite, such as the satellite 106-1, at a time.

The television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 110. For example, an HD channel may be output to a television by the television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 110 may select via tuner, decode, and relay particular transponder streams to one or more of television receivers 110, which may in turn relay particular transponder streams to one or more display devices 160, 160-1. For example, the satellite receiver 108 and the television receiver 110 may, respectively, be configured to receive, decode, and relay at least one television channel to a television by way of a television receiver 110. Similar to the above example, a television channel may generally be presented "live," or from a recording as previously stored by the television receiver 110, and may be output to the display device 160, 160-1 by way of the television receiver 110 in accordance with a particular content protection technology and/or networking standard. Other embodiments are possible.

In various embodiments, the content resources 126 may be used to provide the television receiver 110 with content (e.g., televised and streamed events). The content resources 126 may be used to retrieve televised and/or otherwise streamed events or portions of thereof following and/or during a live broadcast of the televised and/or otherwise streamed events. The content resources 126 may include the content provider 102, the service provider systems 103, the online content sources 112, one or more other television receivers 110, and/or the like.

The content provider 102, which may distribute broadcast televised and/or otherwise streamed events to the television receivers 110 via a satellite-based television programming distribution arrangement (or some other form of television programming distribution arrangement, such as a cable-based network, fiber-based network, or IP-based network, may use an alternate communication path, such as via one or more of the networks 120, to provide televised and/or otherwise streamed events to the television receivers 110. The television receivers 110 may be permitted to request various television programs or portions of televised and/or otherwise streamed events from the content provider 102 via the network 120. For instance, the content provider 102 may be permitted to transmit a portion of a television program or an entire television program during and/or after a time at which the television program was broadcast live by the content provider via a satellite-based television programming distribution arrangement.

In some embodiments, the content provider 102 may provide a televised and/or otherwise streamed event via on-demand content. Such on-demand content may be provided via the satellite-based distribution arrangement and/or via the network 120. On-demand content provided via the satellite-based distribution arrangement may be stored locally by the television receiver 110 to allow on-demand access. On-demand content may also be retrieved via the network 120 from the content provider 102.

The computing devices 116 represent various computerized devices that may be associated with a user of the television receiver 110 and that may be configured to facilitate various adaptive content features disclosed in various embodiments herein. As indicated by 116a, the computing devices 116 may include a laptop computer, a desktop computer, a home server, or another similar form of computerized device. As indicated by 116b and 116c, the computing devices 116 may include a cellular phone and/or smartphone, a tablet computer, or another similar form of mobile device. As indicated by 116d, the computing devices 116 may include smart glasses or another similar form of wearable computing device.

In various embodiments, the television receiver 110 may be provided with access credentials that allow access to content stored and/or accessible through one or more of the computing devices 116. Likewise, in various embodiments, one or more of the computing devices 116 may be provided with access credentials that allow access to content stored and/or accessible through the television receiver 110 and/or account associated therewith and/or associated with an application installed on the one or more of the computing devices 116. It should be understood that computing devices 116 are exemplary in nature. Content may be accessible through a lesser or greater number of computerized devices associated with a user of the television receiver 110.

In some embodiments, the online content sources 112 may represent content resources through which televised and/or otherwise streamed events may be retrieved by the television receiver 110 via the network 120. Each of the online content sources 112 may represent different websites available via the Internet. Periodically, the television receiver 110 may poll online content sources 112 to determine which televised and/or otherwise streamed events are available and/or which television programs are scheduled to be available in the future. In some embodiments, the television receiver 110 may poll online content sources 112 regarding the availability of at least a portion of a specific televised and/or otherwise streamed event.

The service provider systems 103 may correspond to one or more data sources 112 that are any suitable source of data to facilitate embodiments disclosed further herein. In various embodiments, the service provider systems 103 may include one or more computer systems, a database, a website, a portal, any repository of data in any suitable form, a server system, and/or the like. With some embodiments, the data sources 112 may include one or more mobile computing device locator services that provide information regarding the location of one or more computing devices 116. With some embodiments, the data sources 112 may provide various details relating to IP addresses, cellular tower identification and location data, mobile device triangulation data, LAN identification data, Wi-Fi identification data, access point identification and location data, and/or the like data that facilitates location of one or more computing devices 116. With some embodiments, the data sources 112 may provide demographic data about an area encompassing the location of one or more computing devices 116.

In various embodiments, the data from the one or more data sources 112 may be retrieved and/or received by the content provider system 102 and/or the subsystem(s) 111 via one or more data acquisition interfaces through network(s) 120 and/or through any other suitable means of transferring data. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure. In various embodiments, the content provider system 102 and/or the subsystem(s) 111 and the data sources 112 could use any suitable means for direct communication. In various embodiments, content objects 176 and/or 177 may be actively gathered and/or pulled from one or more data sources 112, for example, by accessing a repository and/or by "crawling" various repositories. Additionally or alternatively, the content provider system 102 and/or the subsystem (s) 111 may wait for updates from one or a combination of the content source systems 112. Content objects 176 and/or 177 pulled and/or pushed from the one or more data sources 112 may be transformed, and the transformed content objects 176 and/or 177 and/or other data generated based thereon may be made available by the content provider system 102 and/or the subsystem(s) 111 for use by the subsystem(s) 111 in creating content composites 180.

The television receiver 110 may be able to retrieve at least a portion of a television program through other television receivers 110, which can function as content resources. Similarly, the television receiver 110 may be able to cast at least a portion of a television program through other television receivers 110 and/or to computing devices 116. For instance, a Slingbox® (or other form of media streaming device) functioning in concert with a television receiver 110 may permit television programs to be captured and streamed over the network 120. In some embodiments, the television receivers 110 may have such media streaming capabilities integrated. In some embodiments, the television receivers 110 may cast programming content to the computing devices 116 via wireless signals. For example, the programming content from the television receiver 110 may be indirectly transmitted via a local network (e.g., via Wi-Fi) or directly transmitted to the computing device 116 via a casting device integrated with the television receiver 110 or coupled to the television receiver 110 (e.g., via a dongle). In some embodiments, the programming content may be cast to the computing device 116 via a wired connection (e.g., via one or more of HDMI, USB, lightning connector, etc.). Some embodiments of the television receivers 110 may provide for simulcasting such that the same programming that is being displayed on the display device 160 is being displayed on one or more of the computing devices 116 simultaneously or substantially simultaneously.

While network configuration data may be broadcast repeatedly via satellite to television receivers 110, it should be understood that a similar arrangement may be used in cable-based television programming broadcast networks to broadcast network configuration. For any of the various type of network, various other forms of data may be transmitted via an Internet-based network 120 connection rather than using the content provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

The system 102 with the content composite subsystem 111 may be configured to perform one or more methods for facilitating adaptive content composite generation and interaction with respect to digitally distributed content corresponding to an event, as disclosed herein. The one or more methods may include containerizing and adapting content objects as content composites, as disclosed herein. The event may correspond to a live event. The digital distribution of content corresponding to the event may include one or a combination of streaming, live streaming, other online delivery, over the air delivery, cable-television distribution, satellite television distribution, and/or the like. Thus, as one example, the event may correspond to a live, televised event.

In various embodiments, one or more media devices (e.g., one or more of devices 110 and/or 116 and/or the system 102) may perform all or part of the methods, with a single media device or multiple media devices performing the methods. In various embodiments, part or all of the methods may be performed while an endpoint media device (e.g., one or more of device 110 and/or 116) is receiving televised, streamed and/or otherwise digitally distributed content and/or is outputting the content for display. In various embodiments, at least part of the methods may be performed in advance of the televised, streamed and/or otherwise digitally distributed event and, thus, may be performed while the content is scheduled but before the content is transmitted to endpoint media devices and/or before the content is output by an endpoint media device for display.

Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

Figure 6:
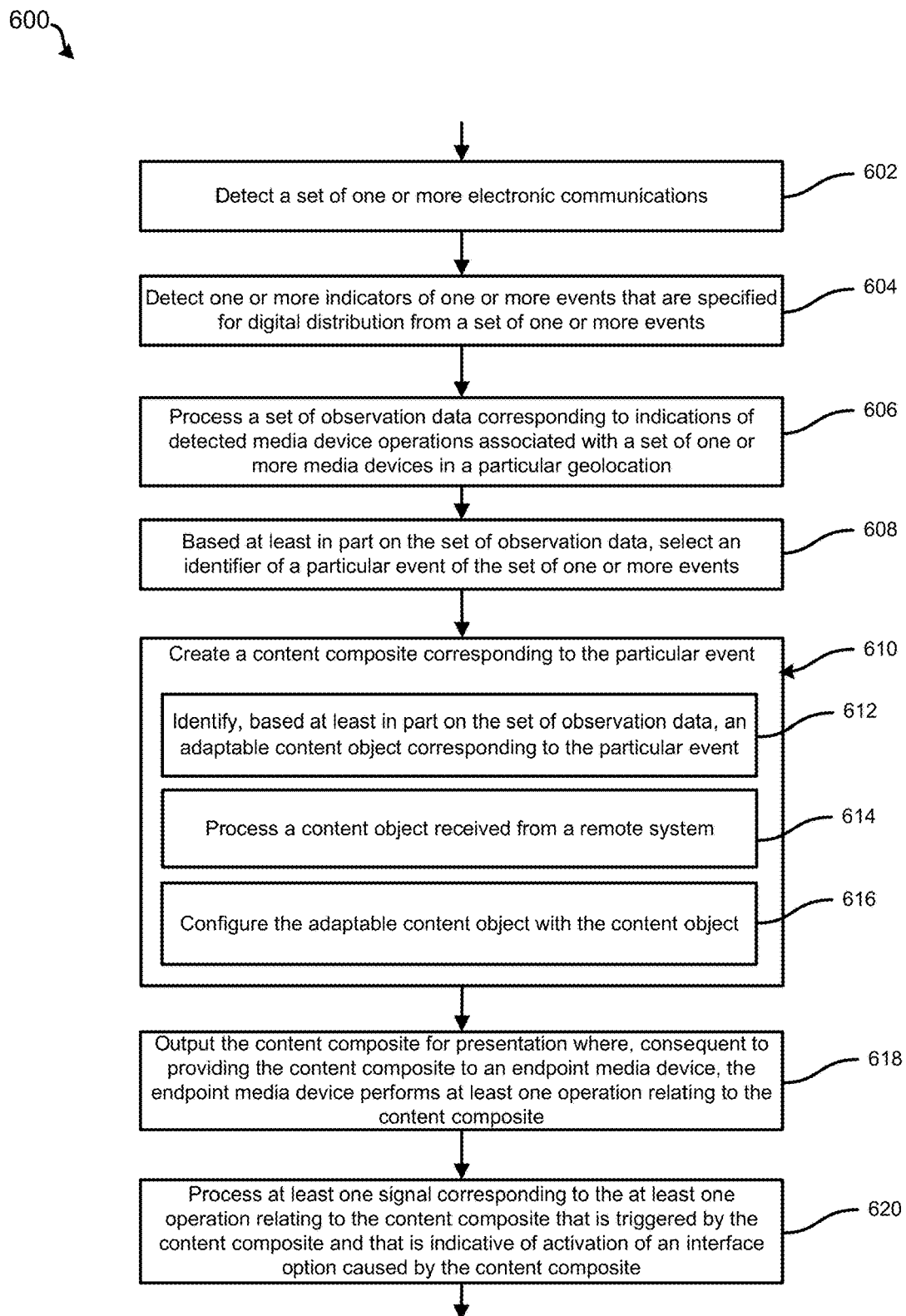
FIG. 6 illustrates an example method for content composite generation with respect to digitally distributed content corresponding to an event, in accordance with disclosed embodiments per the present disclosure.

FIG. 6 illustrates an example method 600 for content composite generation with respect to digitally distributed content corresponding to an event, in accordance with embodiments of the present disclosure. One or a combination of the aspects of the method 600 may be performed in conjunction with one or more other aspects disclosed herein, and the method 600 is to be interpreted in view of other features disclosed herein and may be combined with one or more of such features in various embodiments.

As indicated by block 602, one or more sets of one or more electronic communications may be received via one or more interfaces (e.g., of a media device) and detected. As indicated by block 604, one or more indicators of one or more events of a set of one or more events for which corresponding content is specified for digital distribution may be detected from the one or more sets of one or more electronic communications. For example, the one or more events may include televised events, and the set may include a set of one or more televised events. The corresponding content may be specified for upcoming digital distribution (e.g., for the next 24 hours or any suitable upcoming time period) and/or current, ongoing digital distribution (e.g., a live event is currently in progress and being televised, streamed, etc.). The indicators may include or otherwise correspond to metadata regarding the events, as disclosed further herein. The metadata may be received on-demand (e.g., it may be pulled when needed or on scheduled basis), periodically, and/or on a scheduled basis, in various embodiments. For example, the metadata may be pulled responsive to user activation of a device 116, which may correspond to opening of an app installed on the device 116.

As indicated by block 606, in various embodiments, a set of observation data may be processed, the set of observation data corresponding to indications of detected media device operations associated with a set of one or more media devices 110 and/or 116 in a particular geolocation and mapped to the set of one or more events. The set of observation data may correspond to indications of detected media device operations associated with a plurality of media devices 110 and/or 116 in the particular geolocation. Additionally or alternatively, the set of observation data may correspond to indications of detected media device operations associated with a particular endpoint identifier. Such detected media device operations may include one or more previous interactions with one or more previous content composites 180. Additionally or alternatively, such detected media device operations may include one or more previous operational settings of the plurality of media devices 110 and/or 116 and/or of one or more media devices 110 and/or 116 associated with the particular endpoint identifier. As indicated by block 608, based at least in part on the set of observation data, an identifier of a particular event of the set of one or more events may be selected. Accordingly, the event may be identified for content composite creation.

As indicated by block 610, a content composite 180 corresponding to the particular event may be created, as disclosed further herein. For example, the content composite 180 may be created at least in part by one or a combination of the following. As indicated by block 612, an adaptable content object 176 corresponding to the particular event may be identified based at least in part on the set of observation data. This may include selecting the adaptable content object 176 from a plurality of adaptable content objects 176. As disclosed further herein, such selection may be based at least in part on matching specifications of one or more adaptable content objects 176 with specifications (e.g., the one or more indicators) of the particular event. In various embodiments, the adaptable content object 176 may be received from a system (e.g., 102 or 103) that is remote from the one or more processing devices (which, in various embodiments, may be included in the devices 116, 110, and/or system 102). As indicated by block 614, a particularized content object 177 corresponding to the particular event may be processed. The content object 177 may be received by the one or more processing devices from a system (e.g., 102 or 103) that is remote from the one or more processing devices. As disclosed further herein, the content object 177 may be pushed from the remote system or pulled from the remote system by the one or more processing devices responsive to the one or more processing devices transmitting one or more specifications of the particular event, the adaptable content object 176, and/or the content object 177.

In some embodiments, the creating the content composite 180 may be a function of the current geolocation of the media device 110 and/or 116 associated with the particular endpoint identifier and a set of rules mapped to the current geolocation. In various embodiments, one or both of the adaptable content object 176 and the content object 177 are identified as a function of a current geolocation mapped to the media device 110 and/or 116 associated with the particular endpoint identifier.

As indicated by block 616, the adaptable content object 176 may be configured with the content object 177 so that the content composite 180 causes presentation of the adaptable content object 176 adapted with the content object 177 for at least part of a presentation time when the content composite 180 is presented, as disclosed further herein. As indicated by block 618, subsequently, the content composite 180 may be output by the one or more processing devices for presentation. Consequent to providing the content composite to an endpoint media device 110 and/or 116, the endpoint media device 110 and/or 116 may perform at least one operation relating to the content composite 180, as disclosed further herein. As indicated by block 620, at least one signal corresponding to the at least one operation relating to the content composite 180 that is triggered by the content composite 180 and that is indicative of activation of an interface option caused by the content composite 180 may be processed, also as disclosed further herein.

Figure 7:
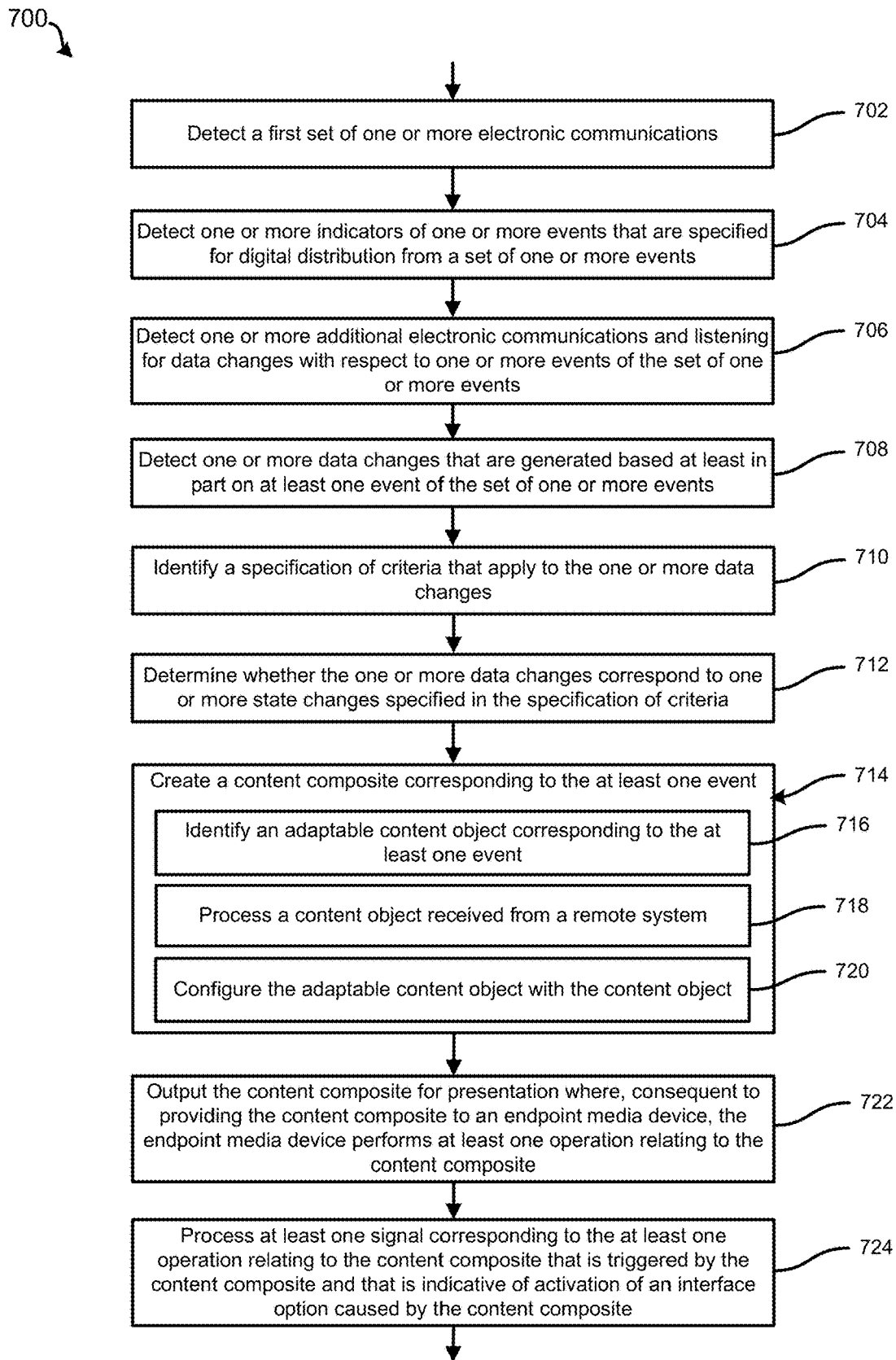
FIG. 7 illustrates an example method for state-based content composite generation with respect to digitally distributed content corresponding to an event, in accordance with disclosed embodiments per the present disclosure.

FIG. 7 illustrates an example method 700 for state-based content composite generation with respect to digitally distributed content corresponding to an event, in accordance with embodiments of the present disclosure. One or a combination of the aspects of the method 700 may be performed in conjunction with one or more other aspects disclosed herein, and the method 700 is to be interpreted in view of other features disclosed herein and may be combined with one or more of such features in various embodiments. In various embodiments, one or more of the methods may additionally or alternatively include one or a combination of the following.

As indicated by block 702, a first set of one or more electronic communications may be received via one or more interfaces and detected. As indicated by block 704, one or more indicators of one or more events of a set of one or more events for which corresponding content is specified for digital distribution may be detected from the one or more sets of one or more electronic communications. As indicated by block 706, the one or more processing devices may detect one or more additional electronic communications received via the one or more interfaces. As indicated by block 708, when listening for data changes in the one or more additional electronic communications with respect to one or more events of a set of one or more events (e.g., the first set, the second set, or another set), the one or more processing devices may detect one or more data changes that are generated based at least in part on at least one event of the set of one or more events. As indicated by block 710, the one or more processing devices may identify a specification of criteria that apply to the one or more data changes. As indicated by block 712, the one or more processing devices may determine whether the one or more data changes correspond to one or more state changes specified in the specification of criteria. As indicated by block 714, consequent to determining that the one or more data changes correspond to the one or more state changes, a content composite 180 corresponding to the at least one event may be created. As indicated by block 716, the content composite 180 may be created at least in part by identifying an adaptable content object 176 corresponding to the at least one event. As indicated by block 718, the content composite 180 may be created at least in part by processing a content object 177 received from a system 102 or 103 that is remote from the one or more processing devices. As indicated by block 720, the content composite 180 may be created at least in part by configuring the adaptable content object 176 with the content object 177 so that the content composite 180 causes presentation of the adaptable content object 176 adapted with the content object 177 for at least part of a presentation time when the content composite 180 is presented. As indicated by block 722, the content composite 180 may be output by the one or more processing devices for presentation, where, consequent to providing the content composite 180 to an endpoint media device 110 and/or 116, the endpoint media device 110 and/or 116 may perform at least one operation relating to the content composite 180. As indicated by block 722, at least one signal corresponding to the at least one operation relating to the content composite 180 that is triggered by the content composite 180 and that is indicative of activation of an interface option caused by the content composite 180 may be processed.

As disclosed further herein, the content object 177 may be based at least in part on the one or more state changes. The one or more state changes may correspond to one or more changes occurring within the at least one event. One or more indicators of the one or more state changes with respect to the event may indicate real-time, real-world, and/or physical state changes such as those disclosed further herein. Additionally or alternatively, the one or more state changes correspond to one or more changes from at least one previous parameter corresponding to the at least one event to at least one updated parameter corresponding to the at least one event, as disclosed further herein. Thus, the content composite 180 may cause display of an interface element that allows user selection to cause communication to the system 102 or 103 of an instruction to configure an executable function in accordance with a set of parameters, where the set of parameters includes the at least one updated parameter. This may correspond to placing a bet with a process-performing system 103 in accordance with a set of parameters that may specify the event, the type of bet, odds, amount placed, and/or the like. Further, the determining whether the one or more data changes correspond to one or more state changes specified in the specification of criteria may include scoring the at least one event according to the criteria. The one or more data changes may correspond to a plurality of data changes, the at least one event may correspond to a plurality of events, and each event may be scored according to the specification of criteria. The plurality of events may be ranked according to the scoring, and the at least one event may be the top-ranked event according to the ranking. Further, the one or more state changes may include upcoming state changes such as commercial breaks, upcoming within a time threshold (e.g., a number of seconds and/or minutes)

In some embodiments, the operations of the methods may begin with or may be initiated by the media device 116 or 110 receiving and processing an electronic communication from a user interface, the electronic communication corresponding to an indicator of content. For example, the indicator may correspond to a selection corresponding to a televised/streamed event, may correspond to an initialization/powering up of the device 116 or 110, a channel and/or stream selection such as a selection to tune to a channel that is streaming the event or that is scheduled the stream the event, an application selection such as a selection to download or otherwise stream the event which may be by way of an application installed on the device 116 or 110, a selection to view and/or record a particular event, and/or the like. Additionally or alternatively, the operations of the methods may begin with or may be initiated separately from such communications. For example, one or more of the operations may be performed as background processes.

The media device 116 or 110 may receive content corresponding to an event and may output the content for display with a display device 160 and/or with a display component of a device 116. The content may be determined to include the televised/streamed event, as preceding the event, and/or as being delivered within a temporal proximity to the event. This may include identifying one or more specifications of the event from the programming content; metadata associated with the programming content; EPG or other schedule data received by the receiver 110 and/or device 116 from the content provider system 102 and mapping such data to the content, channel, and/or current or upcoming time/time period; and/or the like. Some embodiments may further include identifying the televised/streamed event as likely be viewed by a particular viewer based at least in part on viewer pattern data, even though the viewer has not yet made a selection to view and/or record the event. For example, as disclosed herein, the pattern data may indicate a preference for a particular type of event. The subsystem 111 may determine that the event corresponds to the preference and that temporal specifications for the event satisfy one or more temporal thresholds. In some instances, the subsystem 111 may determine that the event is currently ongoing and available for viewing on another channel, stream, or other viewing options that the viewer has not yet selected. Likewise, in some instances, the subsystem 111 may determine that the event is scheduled to be available within a suitable time for threshold (e.g., a number of minutes, hours, days, weeks, and/or the like) for viewing on the same channel, stream, or other viewing option that the viewer has selected or on a different channel, stream, or other viewing option that the viewer has not yet selected.

Figure 2:
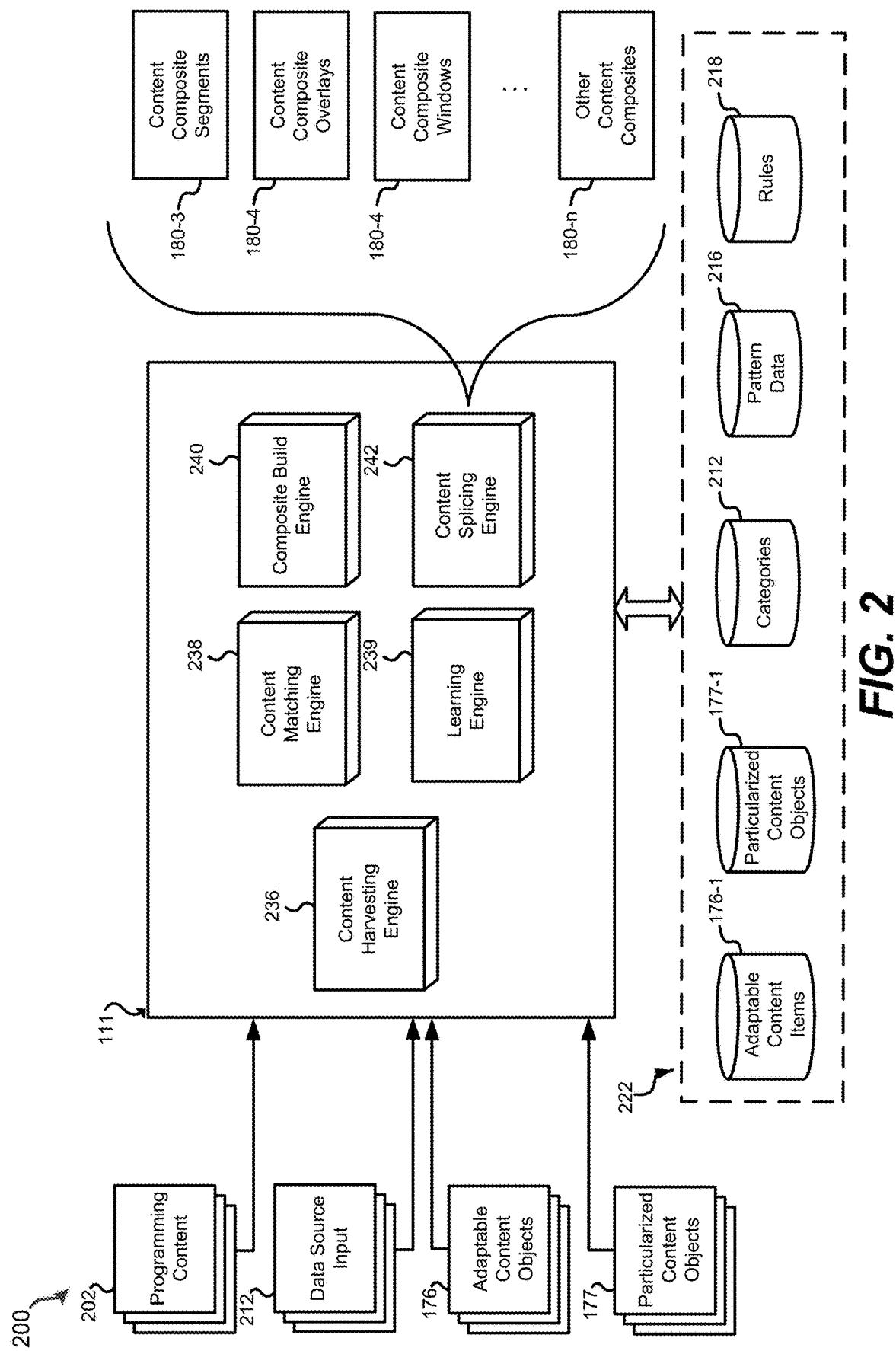
FIG. 2 illustrates a functional diagram of an adaptive content composite generation/control system, in accordance with disclosed embodiments per the present disclosure.

FIG. 2 illustrates a functional diagram of an adaptive content composite generation/control system 200, in accordance with disclosed embodiments of the present disclosure. In various embodiments, the content composite system 200 may be included in whole or in part in the content provider system 102 and/or an endpoint media device 116. In some embodiments, the content composite system 200 may be separate from, and provide content to, the content provider system 102. In some embodiments, the content composite system 200 may be included in the end-user system and may be included in the television receiver 110 and/or one or more of the computing devices 116. In some embodiments, various features of the content composite generation/control system 200 may be distributed between the television receiver 110 and upstream of the television receiver 110. Likewise, in some embodiments, various features of the content composite generation/control system 200 may be distributed between one or more of the computing devices 116 and upstream of the one or more computing devices 116.

While not all components of the adaptive content composite generation/control system 200 are shown, the system 200 may include one or a combination of such components.

As depicted, the content composite generation/control system 200 includes a content composite subsystem 111. The content composite subsystem 111 may include or otherwise correspond to an audiovisual control engine that, as with disclosed embodiments of the other engines, may include instructions retained in processor-readable media and to be executed by one or more processors. The content composite subsystem 111 may be communicatively coupled with interface components and communication channels (e.g., of the television receiver 110 and/or the computing device 116, which may take various forms in various embodiments as disclosed herein) configured to receive programming content 202, which may correspond to televised sporting events, other competitions, television programs, portions thereof, and/or the like. In various embodiments, the programming content 202 may include audiovisual content broadcast and/or otherwise transmitted by the content provider 102 and/or one or more other service providers 103 by way of one or a combination of streaming, live streaming, other online delivery, over the air delivery, cable-television distribution, satellite television distribution, and/or the like. The programming content 202 may include various components, including without limitation, one or more video tracks, audio tracks, audio video tracks, metadata tracks, close captioning information, and/or the like. In some embodiments, the content composite generation/control system 200 may retain received programming content 202 in content storage 222. The content storage 222 may include any suitable form of storage media, such as any suitable form disclosed herein.

The content composite subsystem 111 may be further configured to receive adaptable content objects 176 and particularized content objects 177. The content composite subsystem 111 may include a harvesting engine 236 configured to aggregate adaptable content objects 176, particularized content objects 177, and/or programming content 202 in order to facilitate content composite generation/control features disclosed herein. The content composite subsystem 111 may include a matching engine 238, which, in various embodiments, may be configured to analyze, classify, categorize, characterize, tag, and/or annotate adaptable content objects 176, particularized content objects 177, and/or programming content 202.

The content composite subsystem 111 may include a content composite splicing engine 242. In some embodiments, the content composite splicing engine 242 may include a multiplexer. In various embodiments, the multiplexer may create a digital stream of data packets containing the video, audio, and, in some embodiments, the metadata to output the programming content 202, adaptable content objects 176, and/or the composites 180 created with selected adaptable content objects 176. In various embodiments, the content composite splicing engine 242 may be implemented at the receiver 110, the device 116, and/or the service provider system 102.

In embodiments where the content composite splicing engine 242 is implemented at the service provider system 102, the multiplexed data stream may be transmitted via the one or more networks 124 for provisioning to computing devices 116 or via a particular transponder stream via a transponder of a satellite four provisioning to receivers 110. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the content provider 102. A control word generator may generate the control word that is used by a scrambling engine to scramble the video or audio present in the data packet. Control words generated by the control word generator may be passed to a security system, which may be operated by the content provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for communication to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

In some embodiments, the harvesting engine 236 may be configured to receive, pull, process, buffer, organize, rank, and/or store adaptable content objects 176, particularized content objects 177, programming content 202, and/or data source input 212. In various embodiments, the content provider system 102, the television receiver 110, and/or the computing device 116 may include one or more applications to facilitate the subsystem 111 analyzing and consolidating data source input 212 (e.g., data feeds and/or event updates) received from various data sources 112, which may or may not be included in the service provider systems 103. As an example, data source input 212 may include, but are not limited to, updates (real-time and/or otherwise) and/or continuous data streams received from one or more data sources 112, which may include real-time events related to bookmakers, bookies, sportsbooks, oddsmakers, sports event and/or other competition information, gambling/betting, Twitter® feeds, Instagram® posts, Facebook® updates, and/or the like.

As disclosed above, the adaptable content objects 176 may be particularized to certain services. In some embodiments, the adaptable content objects 176 may correspond to commercials to be presented during commercial breaks of the programming content 202. Additionally or alternatively, the adaptable content objects 176 may correspond to announcements or other content to be presented as overlays, in windows/frames and/or in pop-ups during, before, and/or after events, in various embodiments. Additionally or alternatively, the adaptable content objects 176 may correspond to announcements or other content to be transmitted and presented as text messages, push notifications, email notifications, and other notifications which would typically be received via one or more apps on the device 116 and cause user-detectable notifications in response during, before, and/or or after events, in various embodiments. Additionally, the adaptable content objects 176 may allow for invoking, waking up, opening, and/or otherwise activating an application of the endpoint media device 116, in some instances, when the application is offline and/or otherwise not online with respect to the system 102, 200, and/or another system 103. In various embodiments, the content objects 176 may include audiovisual content broadcast and/or otherwise transmitted by the content provider 102. In some embodiments, adaptable content objects 176 may be pushed by the content provider 102 to the subsystem 111. In addition or in alternative, adaptable content objects 176 may be pulled by the subsystem 111 (e.g., by the harvesting engine 236) from the content provider 102.

The particularized content objects 177 may correspond to content that is particularized to certain types of services and that is sourced by one or more of the service provider systems 103. In various embodiments, the service provider systems 103 may correspond to process-performing systems that may receive instructions to configure executable functions in accordance with set of parameters and, in response, configure the executable functions in accordance with set of parameters. In various embodiments, the service provider systems 103 may correspond to one or more sources of data and/or services corresponding to bookmakers, bookies, sportsbooks, oddsmakers, sports information, event information, gambling/betting, social media websites, and/or the like, and particularized content objects 177 may correspond to the specific data and/or services sourced by a specific service provider system 103 for a specific event. For example, the data may correspond to odds information with respect to a particular sporting event and a particular outcome of the sporting event and/or of certain potential results/actions that could occur within the event. The data may correspond to particular digital content, a matrix code such as a QR code, and/or the like. The services may, for example, correspond to the bookmaker/sportsbook services offered to facilitate betting with respect to the sporting event. In some embodiments, particularized content objects 177 may include content that is particularized to one or more viewers based at least in part on observation data learned about the one or more viewers, as disclosed further herein. As disclosed above, the adaptable content objects 176 and/or the content object objects 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, sets of one or more adaptable content objects 176 and/or sets of one or more content object objects 177 may be transmitted to the subsystem 111 in batches. For example, sets of one or more adaptable content objects 176 and/or sets of one or more content object objects 177 may be transmitted to the subsystem 111 on a periodic or otherwise scheduled basis. The subsystem 111 may store the adaptable content objects 176 locally and, subsequently select one or more of the adaptable content objects 176 when needed for presentation during an upcoming break in the programming content 202 corresponding to an event and/or when needed for presentation during the programming content 202 corresponding to the event based at least in part on the subsystem 111 determining specifications of the event, a temporal progression in the event (e.g., the fourth quarter, the second round, etc.), a state change in the event (e.g., a score change, one team or competitor leading or falling behind, etc.), and/or the like.

In various embodiments, sets of one or more adaptable content objects 176 and/or sets of one or more content object objects 177 may be transmitted to the subsystem 111 on an as-needed basis when the subsystem 111 is receiving programming content 202 corresponding to a certain type (e.g., a televised sporting event for which sports betting information and services are available), is scheduled to receive such programming content 202, is predicted to receive programming content 202 based at least in part on a detected viewing pattern of past viewing of previous programming content 202 (e.g., of a certain type of event, at certain times, on certain days, etc.), and/or is predicted to receive programming content 202 based at least in part on a detected pattern of past viewer responses to content composites for previous programming content 202 of that type. Additionally or alternatively, in some embodiments, sets of one or more adaptable content objects 176 and/or sets of one or more content object objects 177 may be selected (e.g., the service provider system 102) as tailored for particular event viewing habits, betting patterns, and inferred interests of viewers.

In various embodiments, sets of one or more adaptable content objects 176 may be selected (e.g., by the service provider system 102) for particular time periods and may be transmitted to the subsystem 111 with an assignment (e.g., by way of tag data or other metadata) for the designated time period. Additionally or alternatively, in some embodiments, sets of one or more adaptable content objects 176 may be selected (e.g., by the service provider system 102) for particular channels and/or television programs and may be transmitted to the subsystem 111 with an assignment (e.g., by way of tag data or other metadata) for the designated channels and/or television programs. The communication of the sets of one or more adaptable content objects 176 may be in response to the subsystem 111 pulling the sets of one or more adaptable content objects 176 from the service provider system 102. For example, the subsystem 111 may pull adaptable content objects 176 based at least in part on detecting programming content 202 currently being viewed via a television receiver 110 or computing device 116, detecting programming content 202 scheduled to be viewed or recorded, predicting programming content 202 of interest to a viewer based on detected viewing and/or betting patterns (e.g., patterns of interacting with content objects 176, 177), determining upcoming programming content 202 based on electronic programming guide information received, and/or the like.

In a similar manner, sets of one or more content object objects 177 may be pulled from or pushed by one or more service provider systems 103, in various embodiments using one or more of the various methods disclosed, to the subsystem 111 directly or indirectly (e.g., by way of the content provider system 102, which may then transmit the content object objects 177 to the subsystem 111) for particular time periods, with assignments for designated channels and/or television programs. For example, in conjunction with the selection of sets of one or more adaptable content objects 176, sets of one or more content object objects 177 that match the one or more adaptable content objects 176 may be pulled from one or more service provider systems 103. In various examples, the matching may be based at least in part on specifications of the event, a temporal progression in the event (e.g., the fourth quarter, the second round, etc.), a state change in the event (e.g., a score change, one team or competitor leading or falling behind, etc.), and/or the like.

Figure 3:
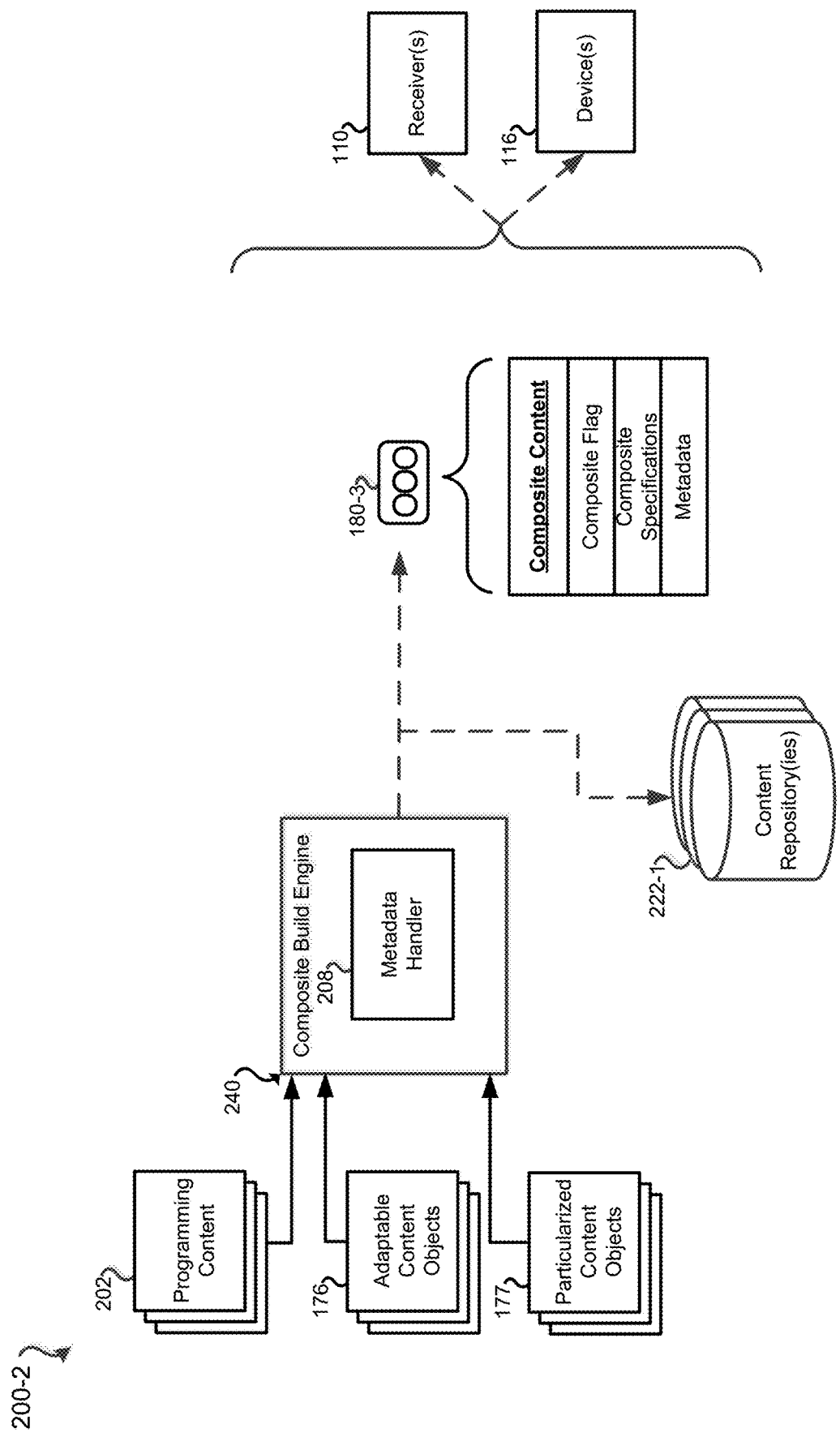
FIG. 3 illustrates a portion of the content composite generation/control system with aggregation and transformation features, in accordance with disclosed embodiments per the present disclosure.

In disclosed embodiments, the content provider 102 and/or the subsystem 111 may selectively aggregate content. By way of example, FIG. 3 is a simplified illustration of a portion of the content composite generation/control system 200 with aggregation and transformation features, in accordance with disclosed embodiments of the present disclosure.

In some embodiments, the subsystem 111 may correspond at least in part to the content provider 102 and may include one or more data management servers. The subsystem 111 may include one or more aggregation and/or transformation engines 231, which may correspond to the content harvesting engine 236 in some embodiments. In various embodiments, the aggregation and/or transformation engine 231 may correspond to an integral engine or separate engines working in conjunction. The aggregation/transformation engines 231 may translate, transform, or otherwise adjust data collected. The aggregation and transformation engines 231 may provide a pipeline that processes data input from regulatory data sources, applies rules, transforms the data into jurisdiction-specific regulatory rules 218, and uses the rules 218 to adaptively control content composite creation, the delivery of such content, and interactions with such content.

In various embodiments, the harvesting engine 236 may include or otherwise operate in conjunction with the matching engine 238, which may operate at partially as a consolidation engine. The matching engine 238 may process manifold data sets that may, for instance, come from different sources 112 or the same source 112, for example, by way of one or more updates to data previously provided by a particular source 112, and the matching engine 238 may consolidate the data sets to form a composite data set. The consolidation may include organizing, categorizing, qualifying, and/or comparing the sets of information; detecting, identifying, and/or handling errors/discrepancies; identifying redundancies; removing redundancies; and/or otherwise processing the data sets. In some embodiments, regulatory objects are consolidated to form set of consolidated rules 218. The objects may correspond to structured data, text, files, documents, and/or the like specifying conditions, criteria, and requirements of jurisdiction-specific regulations. In some embodiments, objects are consolidated and transformed into organized, indexed, categorized, and qualified rules, workflows, and/or decision trees. In some embodiments, the matching engine 238 may identify a subset of data, regulatory rules, and/or one or more data sources 112 (e.g., regulatory authority) that are more important than the rest and may process the subset first. In some embodiments, the matching engine 238 may follow an order of precedence in consolidating the data, rules, and/or data sources. In some embodiments, the consolidation may include removing and/or minimizing redundancy of information and requirements of rules to form a compact set of composite information, requirements, and/or restrictions for a particular location, a particular type of event, a particular type of betting, a particular type of bookmaker/sportsbook, a particular type of device, and/or the like. The matching engine 238 may operate to build one or more sets of data, content, rules, one or more indexes, one or more workflows, one or more decision trees, and/or one or more files particularized to one or more locations and based at least in part on selectively aggregated rules 218. In some embodiments, the matching engine 238 may build multiple sets that relate to one or more rules, but are tailored for different geolocations, jurisdictions, types of events, types of betting, types of bookmakers/sportsbooks, and/or the like.

In some embodiments, the matching engine 238 may translate the data into understandable data, information, and/or content. The transformed data, information, and/or content may be directed to certain tables, indexes, and/or storages based on one or more particular rules, geolocations, jurisdictions, types of events, types of betting, types of bookmakers/sportsbooks, and/or the like. In some embodiments, the selective aggregation, consolidation, and/or feed actions may be performed on an as-needed basis. For example, the selective aggregation, consolidation, and/or feed actions may be triggered when a change to rules is detected consequent to periodic polling of data source systems 103 for updates to rules and/or comparing newly harvested information to previously harvested information. In some embodiments, the selective aggregation, consolidation, and/or feed actions may be performed on a periodic basis based on any suitable time period.

The service provider systems 103 may include manifold content source systems 112, including, for example, sources 112 of objects corresponding to federal information, state information, local information, and/or the like. The harvesting engine 236 may include logic for implementing content aggregation features in various embodiments. In some embodiments, the harvesting engine 236 may be configured to gather data about rules from one or more service provider systems 103 and/or other data source systems sourcing information (e.g., government systems) through one or more networks 120. By way of example without limitation, the engine(s) with one or more the processors, may utilize one or more network interfaces to pull and/or push code from various entities. As disclosed herein, content may be actively gathered by accessing a repository that corresponds to such entities, and content could be gathered by "crawling" the various repositories in some embodiments. Updates for content source systems 112 may be periodically found. Additionally or alternatively, the content provider system 102 and/or the subsystem(s) 111 may wait for updates from one or a combination of the content source systems 112. With some embodiments, any one or combination of the content source systems 112 may provide notifications to the content provider system 102 and/or the subsystem 112 of data to be transferred, such as updated information not previously pulled/pushed to the content provider system 102 and/or the subsystem 112. Certain embodiments may also include data being pre-loaded and/or directly transferred to the content provider system 102 and/or the subsystem 112 (e.g., via a storage medium) in addition to or in lieu of transferring data via a network 120. The harvesting engine 236 could handle processing, extracting, formatting, and/or storing in content storage 222 data including data for code portions. The harvested data may then be analyzed to determine one or more attributes of the code portions.

Various sets of rules 218 may provide for various types of restrictions and/or specifications on creating and/or provisioning content composites 180. In addition to geolocation restrictions/specifications, the various types of restrictions and/or specifications may include time restrictions, such as limits on a time of day when content composites 180 may be presented, limits on time in advance particular event (e.g., days, hours, etc.) and/or portion thereof (e.g., round, quarter, period, etc.) ahead of which content composites 180 may be presented, and the like. Additionally or alternatively, the various types of restrictions and/or specifications may include restrictions on and/or specifications of types of events (e.g., football, soccer, martial arts, types of racing, etc.) for which content composites 180 may or may not be presented and the manner in which content composites 180 may be presented for the different types of events. In some instances, the number and/or frequency of composite 180 presentation may be limited on a per-event basis. Further, the type of betting (e.g., the actions subject to wager) may be restricted by the rules 218 in various ways, depending on the location. Thus, provisioning of content composites 180 may be further differentiated according to event type, with time, place, and/or manner restrictions/specifications contingent on event type. Restrictions on and/or specifications of the manner in which content composites 180 may be presented may include distinguishing types of devices (e.g., smart phone versus laptop computer, laptop computer versus television receiver, etc.) which will display the content composites 180.

To facilitate geo-discrimination to differentiate which sets of rules 218 apply to a given content provisioning instance with respect to an event, disclosed embodiments may provide for capturing and analyzing location data for the receiver 110 and/or device 116 to determine a current location of the receiver 110 and/or device 116 and which content objects 176, 177 to select and present as a function of the current device 116 location, disclosed embodiments may provide for capturing and analyzing location data for the device 116 to determine a current location of the device 116. Location data may be captured to facilitate geo-sensitive adaptive content composite generation/control adaptive content composite generation/control with respect to content 202 corresponding to a televised event as a function of a location detected for the receiver 110 and/or device 116 that receives the content and is to cause display of content composites 180 in conjunction with the content. In various embodiments, the matching engine 238 may include a location correlation engine that may correlate location data to a set of one or more zip codes (or other postal codes) and a corresponding rule set identifier for a set of one or more rules 218 mapped to the set of one or more zip codes (or other postal codes) via identifiers keyed with one or more tables and/or indexes.

In various embodiments, location data may be determined by television receivers 110 and/or devices 116, and such data may be sent to the system 102. The television receivers 110 and/or devices 116 may, in some embodiments, have location detection capabilities based at least in part on location data provided by way of device GPS capabilities, Wi-Fi, cellular, other access points, subscriber/account information, and/or the like techniques for determining a current location of the respective receiver 110 and/or device 116, and corresponding location data may be transmitted to the system 102. In some embodiments, the system 102 may gather the location data. In some embodiments, where the location data does not explicitly indicate a geolocation, the system 102 may determine geo-locations by cross-referencing subscriber/account identifiers with stored geolocation data associated with subscribers/accounts.

In some embodiments, the receiver 110 and/or device 116 may include at least one antenna for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The antenna may include a cellular antenna (e.g., for sending and receiving cellular voice and data communication, such as through a network such as a 3G, 4G, or 5G network). In addition, the receiver 110 and/or device 116 may include one or more interfaces in addition to the antenna, e.g., a wireless interface coupled to an antenna. The receiver 110 and/or device 116 may include one or more communications interfaces that can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the receiver 110 and/or device 116 may include may be capable of transmitting and receiving information wirelessly through both short range, radio frequency (RF) and cellular and Wi-Fi connections.

Additionally, in some embodiments, the receiver 110 and/or device 116 may be capable of communicating with a Global Positioning System (GPS) in order to determine to location of the respective receiver 110 and/or device 116. The antenna may be a GPS receiver or otherwise include a GPS receiver. In various embodiments, communication with the receiver 110 and/or device 116 may be conducted with a single antenna configured for multiple purposes (e.g., cellular, transactions, GPS, etc.), or with further interfaces (e.g., three, four, or more separate interfaces). In some embodiments, an application installed on the receiver 110 and/or device 116 may cooperate with the system 102 to facilitate tracking of locations of the receiver 110 and/or device 116. For example, the receiver 110 and/or device 116 may transmit location data to any suitable backend system component. The location data may be a combination of data based on one or a combination of GPS, Wi-Fi, cellular, device sensor(s) such as a barometric sensor or accelerometer, RFID device signals, and/or other techniques for determining a current location of the receiver 110 and/or device 116.

The receiver 110 and/or device 116 may access the one or more networks 120 through one or more wireless links to one or more access points. The access points may be of any suitable type or types. For example, an access point may be a cellular base station, an access point for wireless local area network (e.g., a Wi-Fi access point), an access point for wireless personal area network (e.g., a Bluetooth access point), etc. The access point may connect the receiver 110 and/or device 116 to the one or more networks 120, which may include the Internet, an intranet, a local area network, a public switched telephone network (PSTN), private communication networks, etc. In some embodiments, access point(s) may be used in obtaining location data for the receiver 110 and/or device 116.

FIG. 3 is a simplified illustration of a composite build engine 240, in accordance with disclosed embodiments of the present disclosure. In various embodiments, the composite build engine 240 may be included in the subsystem 111 or may be separate from the subsystem 111. The composite build engine 240 may, in some embodiments, be included in the content provider system 102. Having processed an adaptable content object 176, the subsystem 111 may create one or more content composites 180 that may include the adaptable content object 176.

To create the content composites 180, disclosed embodiments may configure the content object 176 with at least in part as a containerization object that containerizes at least part of the particularized content object 177 to facilitate various features disclosed herein. The composite build engine 240 may configure the content composites 180 to include a composite flag that may include one or more parameters and may indicate one or more composite specifications. For example, in various embodiments, the composite flag may include indicia of access and reference to one or more other composite specifications, access and reference to other metadata, and/or the like. Further, the composite build engine 240 may configure the composite 180 to include the composite specifications to facilitate performance of a set of one or more operations by the one or more endpoint media devices 116 or 110 with respect to the composite 180 consequent to the one or more endpoint devices 116 or 110 receiving the content composite 180. In various embodiments, the composite specifications may include one or a combination of instructions, metadata, one or more URLs, instructions to configure an executable function in accordance with a set of parameters, and/or the like to specify and facilitate performance of the set of one or more operations by an endpoint media device 116 or 110. In some embodiments, the composite specifications may include at least part of the particularized content object 177.

The composite build engine 240 may identify one or more portions of adaptable content object 176 to be augmented based at least in part on content object 177, which may, in various embodiments, be identified by image analysis and/or analysis of tag data that defines one or more areas within frames that correspond to certain portions represented within the frames for augmentation. As disclosed herein, such tag data could define the area of interest in any suitable way in various embodiments which could be by way of any one or combination of mattes, masks, pixel identification (which could, for example, include identification of pixel coordinates and ranges thereof to define areas of interest), pixel color component characteristics such as color component values, overlays, and/or the like, allowing for correlation to the area to be augmented in any suitable way. In some embodiments, a processor (such as a main processor, a core processor, digital signal processor, and/or like) may take a definition of the augmentation area with respect to one or more reference frames and may perform auto-correlation of related images in a video stream to identify/define the augmentation areas in other frames of the video sequence that represent the portion to be augmented. Image characteristics (e.g., color, brightness, etc.) of the area of interest with respect to the reference frame(s) could be measured, quantified, and/or otherwise identified, and matched with measured image characteristics of the other frames to define the area to be augmented in multiple frames in an image-changing sequence. Accordingly, certain embodiments may allow for handling the complexity of multiple on-screen options by distinguishing particular areas in dynamic, image-changing content.

Accordingly, the content composite 180 may include at least part of the content object 177 and the particularized content object 177 at the time the content composite 180 is transmitted to one or more endpoint media devices 116, with the particularized content object 177 separate from or grafted into the content object 176 such that the content object 176 is an adapted content object 176 adapted with the particularized content object 177. In some embodiments, the content composite 180 may not include a particularized content object 177 at the time the content composite 180 is transmitted to one or more endpoint media devices 116 or 110. In such instances, the particularized content object 177 may be fetched per the composite specifications from the system 102, 200, another data source 103, or from storage of the endpoint media device 116 or 110, and may be used by an endpoint media device 116 or 110 to adapt the content object 176. The composite specifications may include instructions and build specifications according to which the endpoint media device 116 or 110 may merge the pulled/retrieved particularized content object 177 with the content object 176.

In some embodiments, the composite flag and/or composite specifications may prompt the endpoint media device 116 or 110 to execute the instructions to perform at least one operation of the set of one or more operations facilitated by the composite object 180. In some embodiments, APIs may be used to instruct the endpoint media device 116 as to what to do with the composite flag and/or composite specifications. In some embodiments, the composite flag and/or composite specifications may allow for invoking, waking up, opening, and/or otherwise activating an application of the endpoint media device 116 responsive to the decryption of the composite flag and/or composite specifications, in some instances, when the application is offline and/or otherwise not online with respect to the system 102, 200, and/or another system 103. The composite flag and/or composite specifications may prompt the endpoint media device 116 or 110 to causes display of an interface element that allows user selection to cause communication to the process-performing system 103 of an instruction to configure an executable function in accordance with a set of parameters. In some embodiments, the composite flag and/or composite specifications may include a report flag that triggers one or more return channel communications. The corresponding instructions may instruct the endpoint media device 116 or 110 to report to the system 102, 200, and/or another system 103 with one or more return channel communications indicating detection of one or more operations executed consequent to the presentation of a composite 180 such as opening a mobile app the endpoint media device 116, utilizing the composite 180 to place a bet, bets placed, metrics of the operations (e.g., time of execution); and/or the like. The return channel communications may contribute to the observation data 229 and feedback loop features disclosed further herein.

Additionally, in various embodiments, with selection of a content composite 180 to select an executable function for a system 103, the devices 110 and/or 116 may automatically record the event corresponding to the content composite 180. This feature may to any of the composite 180 selections disclosed herein such that, where the selections instruct the system 103, the parallel instructions are issued to the devices 110 and/or 116 to record the corresponding event. When the selections are made via the receiver 110, the composite instructions may directly instruct the receiver 110 to record the event. However, when the selections are made via a device 116, the instruction may be communicated from the device 116 to a receiver 110 that is associated with the account identifier. Such instruction may be made directly to the receiver 110 when it is determined that the device 116 and the receiver 110 are communicatively couplable, such as in the subsystem 300. The communication of the instruction may be made directly via Bluetooth, Wi-Fi, and/or the like when such connections are available. However, when such connections are not available directly to the receiver 110, the instruction may be communicated indirectly via return channel communications as disclosed herein. However, when it is determined that no such receiver 110 is associated with the account identifier, instruction may be communicated to the service provider system 102 via return channel communications, and the system 102 may record the events or, where such recording is already automatically provided by the system 102, the system 102 may receive the instruction and later make the recordings accessible to the device 116.

Further, as disclosed further herein, the subsystem 111 may detect triggers corresponding to a viewer's previous selections of composites 180, or the triggers may correspond to shifting odds due to developments occurring within the event (e.g., underdog is actually close or ahead, an upset is imminent, etc.), detecting a state change in the event (e.g., a score change, one team or competitor leading or falling behind, etc.), and/or the like. The subsystem 111 may compare such developments and state changes to the viewer's previous selections of composites 180. This may correspond to comparing the evolution of the games and odds and bets already placed by the viewer. The subsystem 111 may identify where the bets have become increasingly unlikely to result in a win, or where the bets are close or highly likely to result in a win. Responsive to detecting one or more of such situations, the subsystem 111 may create additional composites 180. Such composites 180 may indicate the detection of such situations, may notify the viewer of the watch ability of the event, that the viewer may want to tune in or pay attention to the ongoing event, and/or may identify additional possible executable functions that could be selected in view of the developments detected for the events. Still further, the subsystem 111 may correlate such developments in the events to timing specifications for the recordings of the events may highlight, mark, and/or otherwise record presentation times corresponding to the developments within the recordings of the events. In various embodiments, the subsystem 111 may then create selectable options for skipping to the corresponding segments within the recordings, and/or may create cuts of the recordings corresponding to the segments for highlights that can be made accessible and viewable to the viewer. Listings of the recorded content for the events and/or highlights may be made available with any suitable graphical indicia and descriptive content be additional composites 180 and/or the augmentation interface disclosed herein.

To facilitate the content composite 180, the composite build engine 240 may include a metadata handler 208 that may generate metadata (e.g., one or more tags) corresponding to identifiers, attributes, characteristics, and/or categories of programming content 202, adaptable content objects 176, and/or particularized content objects 177. In various embodiments, the metadata 210 may be inserted into the output programming content 202, output adaptable content objects 176, and/or output particularized content objects 177. In some embodiments, the one or more tags 210 may not be inserted into the programming content 202, adaptable content objects 176, and/or particularized content objects 177 but may be sent with the output programming content 202, output adaptable content objects 176, and/or output particularized content objects 177. composite build engine 240 may assign packet identifiers to identify data of the content that is to be transmitted as part of a data stream to a receiver 110 and/or device 116 and that is to be associated with one or more tags. Accordingly, the content splicing subsystem 111 may output one or a combination of metadata-augmented programming content 202-1, metadata-augmented content objects 176-1, and/or metadata-augmented content objects 177-1. In some embodiments, one or a combination of metadata-augmented programming content 202-1, metadata-augmented content objects 176-1, and/or metadata-augmented content objects 177-1 may be stored at least temporarily in one or more repositories 222. In some embodiments, tag data may be stored at least temporarily in one or more repositories 222. The content matching engine 238 may identify a televised event in the programming content 202 and may identify one or more corresponding identifiers, attributes, characteristics, and/or categories of programming content 202, adaptable content objects 176, and/or particularized content objects 177 of one or more adaptable content objects 176 and/or one or more particularized content objects 177. Based at least in part on such identification, the composite build engine 240 may create metadata, which, in some embodiments, may correspond to tag data.

Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers. For example, the metadata for the televised event may identify the particular event. The metadata may further identify one or more attributes of the particular event (e.g., any suitable identifier for the participating entities, the location of an event, and/or the like). In some embodiments, at least a portion of the metadata augmentation may be performed at the content provider system 102 such that one or more tagged composite components may be is provided to an endpoint media device 116. Subsequently, the endpoint media device 116 may identify composite components, for example, by processing the metadata.

The metadata for adaptable content objects 176 may, for example, identify the adaptable content objects 176 as being adaptable with any suitable identifier, such as a flag, field value, etc. Additionally or alternatively, the metadata for the adaptable content objects 176 may identify that the adaptable content objects 176 are designated for a certain event or category of events with any suitable identifier. The metadata for the adaptable content objects 176 may further identify one or more attributes of the particular event (e.g., any suitable identifier for associated entities, location, a temporal attribute such as a time of an event, and/or the like). Additionally or alternatively, the metadata for the adaptable content objects 176 may identify transition points, hooks, frames, windows, other portions designated for overlays, and/or the like for merging with content objects 177 such that content from the content objects 177 is merged at the transition points, hooks, frames, windows, other portions designated for overlays, and/or the like.

In some embodiments, metadata-augmented adaptable content objects 176 may be provided by the system 102 to the receivers 110 and/or devices 116, after which the receivers 110 and/or devices 116, each having at least a portion of the content composite subsystems 111, may process and use the metadata to facilitate matching adaptable content objects 176 with corresponding televised events of the programming content 202. Likewise, the receivers 110 and/or devices 116 may process and use the metadata to facilitate matching adaptable content objects 176 with corresponding content objects 177 and then creating content composites 180 therefrom. Thus, the metadata may facilitate the receivers 110 and/or devices 116 appropriately providing corresponding content composites 180 for display with appropriate placement with respect to televised events at commercial breaks and/or during event presentation of the televised events.

In a similar manner, metadata-augmented content objects 177 may be provided by the service provider system 102 to the receivers 110 and/or devices 116. The metadata for adaptable content objects content object 177 may, for example, identify an identifier of the particular event (e.g., any suitable identifier for a game, match, competition, and/or the like). The metadata for the content objects 177 may further identify fields and content for one or more attributes of the particular event, such as any suitable identifier for the competitors, the location of the event, a temporal attribute such as a time of the event or a progression of the event, performance metrics of one or more competitors in the event (e.g., possession time, attempts, hits, strikes, takedowns, interceptions, completions, baskets, assists, fouls, etc.), a state change in the event (e.g., a score change, one team or competitor leading or falling behind, etc.), odds information with respect to a particular sporting event and a particular outcome of the sporting event and/or of certain potential results/actions that could occur within the event, URLs and hyperlinks to betting platforms/websites of systems 103 and/or sites for further information, and/or the like. In some embodiments, at least a portion of the metadata augmentation may be performed at the service provider system 102 and/or the service provider system 103 such that tagged content objects 177 are provided to the receivers 110 and/or devices 116 from the systems 102 and/or 103. Subsequently, the receivers 110 and/or devices 116 may process and use the metadata to facilitate matching adaptable content objects 176 with corresponding content objects 177 and then creating content composites 180 therefrom. Thus, the metadata may facilitate the receivers 110 and/or devices 116 matching adaptable content objects 176 with corresponding content objects 177 and then creating content composites 180. Alternatively, the receivers 110 and/or devices 116, having at least a portion of the content splicing subsystem 111, may process the content objects 177 in the form in which they are received (e.g., directly from a service provider 103) and, based on such processing, may match the content objects 177 to a particular event and/or may identify other attributes of the content objects 177 without the content objects 177 being received as augmented with metadata. In any case, in some embodiments, the receivers 110 and/or devices 116, each having at least a portion of the subsystems 111, may create the content composites 180. Yet, as another alternative, the service provider 102, having at least a portion of the subsystem 111, may create the content composites 180 and transmit the content composites 180 to the receivers 110 and/or devices 116.

The learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of viewer pattern data 216. As disclosed herein, the subsystem 111 may determine an event that the viewer actually is viewing, is about to view (e.g., the televised event is scheduled to play on the channel that the viewer is currently viewing), or is likely to view as determined with the learning engine 239. The subsystem 111 may push information indicating the event to one or more service provider systems 102 and/or 103. In some embodiments, the service provider system 102 may select one or more adaptable content objects 176 matching the televised event for transfer to the subsystem 111 which, as disclosed herein, may be a part of the content provider system 201 and/or may be part of the receiver 110 and/or devices 116. The subsystem 111 may select from the one or more adaptable content objects 176 as matching particular segments of the event and, utilizing a content composite splicing engine 242 in some embodiments, may output one or more corresponding content composites 180 for display after the particular segments and/or simultaneously with the particular segments.

In various embodiments, one or more of the service provider systems 102, 103 may select one or more particularized content objects 177 matching the event for transfer to the subsystem 111. In some embodiments, one or more of the service provider systems 102, 103 may select a set of one or more particularized content objects 177 for transfer (e.g., based on recency of information updates corresponding to the content objects 177) for transfer to the subsystem 111, and the subsystem 111 may determine which content objects 177 from the set that match the event. As disclosed above, the content composite subsystem 111 may include a matching engine 238 that may include logic to implement and/or otherwise facilitate any taxonomy, classification, categorization, correlation, mapping, qualification, scoring, organization, and/or the like features disclosed herein.

Figure 4:
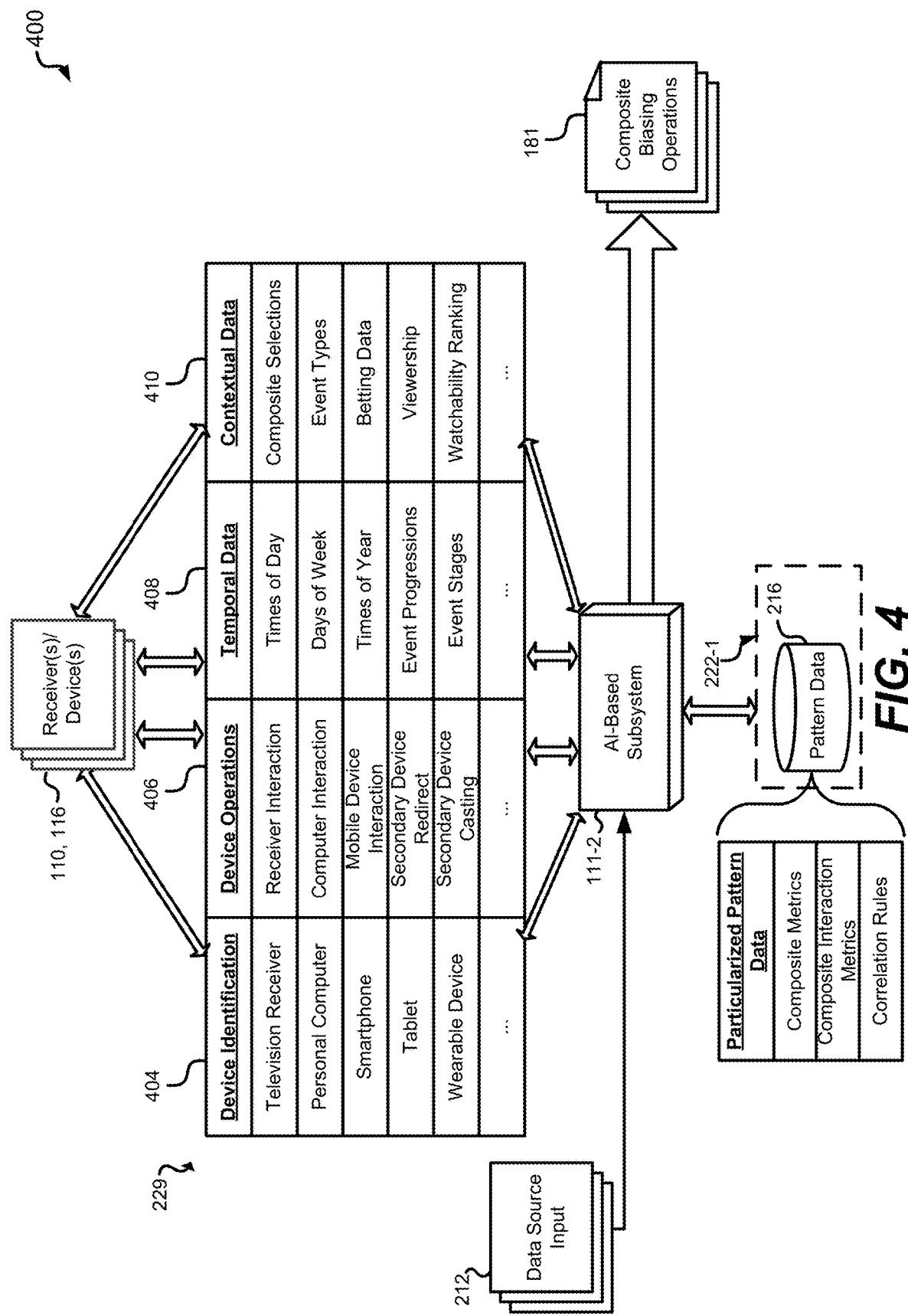
FIG. 4 illustrates a subsystem data flow, in accordance with disclosed embodiments per the present disclosure.

FIG. 4 illustrates certain aspects of the AI-based subsystem data flow 400, in accordance with various embodiments of the present disclosure. The content processing subsystem 111 may be configured to gather observation data 229, which may be specific to one or more particular identified users and/or may be generally related to particular receivers/devices 110, 116. The observation data 229 may be gathered from one or more receivers 110 and/or devices 116, aggregated, consolidated, and transformed into viewer pattern profiles that include personalized pattern data 216.

In embodiments where the learning engine 239 is included in a receiver/device 110, 116, the receiver/device 110, 116 may be a self-observer that may additionally gather additional observation data 229. In various embodiments, the data from the one or more receivers/devices 110, 116 may be retrieved and/or received by the content processing subsystem 111 via one or more data acquisition interfaces, which may include interfaces of the content processing subsystem 111, the one or more receivers/devices 110, 116, and/or the like—through network(s) 120 in various embodiments, through any suitable means for direct communication, and/or through any other suitable means of transferring data. According to various embodiments where the subsystem 111 is included in a service provider system 102, observation data 229 may be actively gathered and/or pulled from the one or more receivers/devices 110, 116.

As disclosed herein, in various embodiments, the one or more data acquisition interfaces may include one or more APIs that define protocols and routines for interfacing with the one or more receivers/devices 110, 116 and which may specify API calls to/from one or more receivers/devices 110, 116. In various embodiments, the APIs may include a plug-in to integrate with an application of one or more receivers/devices 110, 116. The API translation profiles may translate the protocols and routines of the data source component and/or system to integrate at least temporarily with the system and allow one-way communication to the system 102 and/or two-way communication with system 102 in various embodiments by way of API calls.

Various embodiments of the subsystem 111 may aggregate observation data 229 to derive device identification data 404, device operations 406, temporal data 408, and/or contextual data 410. The device identification data 404 may include any suitable data for identifying and tracking particular receivers 110 and devices 116; associated accounts, subscribers, and viewers; and/or the like disclosed herein. The device operations data 406 may include any suitable data for identifying and tracking device operations and interactions as those disclosed herein. The contextual data 410 may include metrics and patterns of viewer interactions/responses pursuant to provisioning of content composites 180 and biasing 181. For example, viewer responses to content composites 180 provisioning may include indications of whether the viewer selected a user-selectable options provided with composites 180, the types of such selections, and/or types of consequent interactions with service provider systems 103. For example, the metrics and patterns may take into account whether the viewer opted out of content composites 180, whether the viewer selected links of composites 180 to interact with the platforms and sites of one or more service provider systems 103, whether the viewer selected options to redirect content composites 180 and/or notifications from service provider systems 103 to a secondary device 116, which service provider systems 103 the viewer selected, whether the viewer placed bets and the types of the viewer's bets and other interactions with service provider systems 103, which types of events and outcomes the viewer placed bets on, amounts wagered, and/or the like. The temporal data 408 may include metrics such as any information to facilitate detection, recognition, and differentiation of one or combination of temporal factors correlated or which the content processing subsystem 111 correlates to other observation data 229 such as device identification data 404, contextual data 410, and/or the like. For example, the temporal data 408 may include time of day information, time of week information, time of year information, holiday information, etc. when the viewer made selections and bets; when during the progression of the events, sports seasons, postseasons, championships, and/or similar stages that the viewer made selections and placed bets; and/or the like.

As disclosed herein, the subsystem 111 may be configured to receive, pull, process, buffer, organize, rank, and/or store data source input 212, which may be included in the observation data 229. This may include collecting data source input 212 from a plurality of devices 110 and/or 116 and/or from one or more data source systems 112 via the one or more data acquisition interfaces. As disclosed herein, data source input 212 may include, but are not limited to, updates (real-time and/or otherwise) and/or continuous data streams received from one or more data sources 112, which may include real-time events related to bookmakers, bookies, sportsbooks, oddsmakers, sports event and/or other competition information, gambling/betting, Twitter® feeds, Instagram® posts, Facebook® updates, and/or the like. Observation data 229 may be actively gathered and/or pulled from one or more data sources, for example, by accessing a repository and/or by "crawling" various repositories. The observation data 229 may include user indications of preference of entities and subject matter, such as positive ratings, indication of liking an entity, sharing entity-specific and/or subject-matter-specific information with others that the user has made via webpages and/or social media. This information may be compiled in real-time or near real-time and may be used to trigger composite 180 generation and communication. The subsystem 111 may determine based at least in part on the observation data collected from one or more of the data source systems (e.g., a social media system) strong preferences and/or aversions to particular sports teams/competitors. For example, an aversion may be inferred from negative indicia (e.g., dislikes of the particular team on a social media profile of the contact) and/or positive indicia (e.g., likes of another team that is a determined rival of the particular team), and, in some instances) recent games (i.e., wins/losses) of the two teams.

The contextual data 410 may include viewership data. In some embodiments, the service provider system 102 may include a viewership data engine that is configured to facilitate identification, aggregation, consolidation, and qualification of viewership data pertinent to a plurality of viewers of devices 116 and 110 in various geolocations. The harvesting engine 236 may be configured with logic to process, analyze, retrieve, pull, cause communication of, derive, compile, aggregate, categorize, characterize, rank, handle, store, report, and/or present any suitable information/content pertaining to viewership—e.g., implicit content ratings derived from histories and patterns of viewing and recording, and explicit content ratings input by viewers. The harvesting engine 236 may be configured to cause viewership information to be transmitted from devices 116 and 110 to the service provider system 102 for identification, aggregation, consolidation, and qualification of viewership data pertinent to a plurality of viewers of devices 116 and 110 in various geolocations. In some embodiments, the viewership data engine may correspond to the harvesting engine 236. In some embodiments, the viewership data and the determination of viewership characteristics may be based at least in part on real-time or near real-time back-channel information from viewing devices 116 and 110 indicating the channels and/or events being viewed and/or recorded, viewer profiles, viewer selections, viewer geolocations, viewer ratings of events, viewing history, explicit user preferences, user characteristics, and/or the like. Aggregated viewership data may be analyzed to identify a set of one or more viewership characteristics with respect to events. Based at least in part on the viewership data, content matching engine 238 and/or the learning engine 239 may differentiate and qualify one or a combination of events being viewed and/or recorded, viewer profiles, viewer selections, viewer geolocations, viewer ratings of events, viewing history, explicit user preferences, viewer characteristics (e.g., demographics), and/or the like. Some embodiments may employ a decision tree, checklist, workflow, and/or the like to capture various aspects of viewership data and assess those aspects to infer event qualification.

Some embodiments may qualify an event according to a gradated viewership scale. Any suitable viewership scale may be used in various embodiments. In some embodiments, a viewership scale could entail a categorization scheme, with categories such as high viewership, medium viewership, and low viewership, or any suitable categories. In some embodiments, a viewership scale could entail an event scoring system. The event scoring system could be correlated to the category scheme in some embodiments, such that certain scores correspond to certain categories. Some embodiments may score an event with a numerical expression, for example, a viewership score. A viewership score may be an assessment of an event's current, past, and/or predicted viewership. Accordingly, a viewership score may indicate which events have had, currently have, and or are forecasted to have greater viewership than other events. In addition to or in alternative to employing real-time viewership qualification, certain embodiments may predict viewership of events based at least in part on historical viewership data of specific events and/or of one or more categories to which events are mapped. Such categories may include one or a combination of geolocation, event type, executable function type (e.g., bet type), parameters for the executable function (e.g., bet parameters, odds, etc.), demographics, social trending, particular competitors (e.g., rivals), tournament/playoffs versus regular season, and/or the like which may be correlated to viewership scores to refine the viewership qualifications for correlation to particular viewers in order to trigger composite 180 generation and presentation for the particular viewer as a function of one or more of these categories. Accordingly, certain embodiments may accord viewership scores based at least in part on such corresponding historical viewership data, which may include previous viewership score, and some embodiments may employ geo-discrimination to differentiate which events are likely to have greater viewership in certain geo-locations as compared to other events. For example, a viewership score for a football game may be assigned a greater number of points when the service area includes a hometown of one of the football teams playing in the game. Hence, the viewership score for the game may be higher when there is a correlation between the game a particular geolocation than when there is not such a correlation. Likewise, the system 102 may recognize situations where a significant viewership exists in geolocations that not hometowns of the football teams playing in the game. For example, a geo-tailored viewership score for the football game may be assigned a greater number of points when the service area includes a significant number of fans even though there is no explicit connection to the football game. Hence, the viewership score for the game may be higher when the system 102 accounts for a significant pocket of fans of the Kansas team that are located in Colorado, even though the team from Colorado is not playing the game. Accordingly, certain embodiments may more accurately differentiate which events are likely to have greater viewership in various geo-locations.

The learning engine 239 may map one or a combination of various extra-composite metrics of the observation data 229 to the metrics of the particular composites 180 provided to a particular viewer. Based at least in part on taking into account such observation data 229 as part of a feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem 111 may be configured to employ machine learning to process the observation data 229 and the content objects 180 and to derive and develop the personalized pattern data 216. The content processing subsystem 111 may be configured to employ deep learning to process the observation data 229 and the content objects 180 and to derive and develop the personalized pattern data 216. The learning engine 239 may be configured to perform any one or combination of features directed to matching or otherwise correlating the observation data 229—such as the device identification data 404, the device operation identification data 406, the temporal data 408, the contextual data 410, descriptive information of the content objects 180, and/or the like—with intra-content metrics of the content objects 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238.

The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content objects 176 and/or content objects 177 (e.g., which may be based at least in part on the metadata features disclosed herein) for content composite 180 creation. For example, the learning engine 239 may learn that a particular viewer tends to interact with content composites 180 that are directed to only certain types of events. Such event type differentiation may be on the macro level, such as recognizing that a viewer tends to interact more with composites 180 directed to certain types of sports and not other types of sports. Accordingly, the subsystem 111 may bias content composites 180 provisioning toward the types of sports that tend to cause viewer interaction and decrease composite 180 provisioning frequency or cease provisioning for other types.

Further, the learning engine 239 may learn that a particular viewer tends to interact with content composites 180 that are directed to only types of events within a particular category (e.g., more high-profile events such as post-season events and/or championship events as opposed to regular season and/or non-championship events). Accordingly, the subsystem 111 may likewise bias content composites 180 provisioning toward such types of events and decrease or cease provisioning with respect to other types. Further, viewer interaction differentiation may be on the micro level, such as recognizing that a viewer tends to interact more with composites 180 directed to certain types of outcomes and state changes with respect to particular events. For example, the learning engine 239 may detect a viewer pattern of interacting only with composites 180 directed to the potential final outcomes/results of an event (e.g., final score, winner, etc.) or may detect a viewer pattern of interacting with more micro-level potential outcomes that can occur within an event (e.g., scoring on particular drives, takedowns, files, per-competitor performance, etc.). Accordingly, the subsystem 111 may likewise bias content composites 180 provisioning toward such types of outcomes and decrease or cease provisioning with respect to other types. Thus, the subsystem 111 may adapt composite 180 provisioning to maximize viewer engagement, and, when the subsystem 111 detects state changes in televised events that are mapped to viewer patterns of composite 180 interaction corresponding to such state changes and events, the subsystem 111 may initiate the polling of one or more corresponding adaptable content objects 176, the polling of one or more corresponding content objects 177, and/or the creation of one or more corresponding composites 180 as a function of the detected state change and the detected viewer pattern in order to provide tailored composites 180 to a viewer in response to the detected state change.

Further, in situations where a pattern of more micro-level interactions detected for particular viewer, the subsystem 111 biasing 181 of composites 180 may include serial provisioning of composites 180 in a serial drill-down manner such that the first composites 180 provisioned may be directed to a more macro-level outcome and one or more composites 180 subsequently provisioned may be directed to more micro-level outcomes in accordance with the detected pattern. Thus, disclosed embodiments may provide for serial matching of composites 180 with respect to one another in order to provision the composites 180 with a trend that matches the detected pattern.

Accordingly, as part of such learning and adaptation processes, the subsystem 111 may bias 181 composite 180 provisioning (which may correspond to bet recommendations) toward a particular viewer based at least in part on what the subsystem 111 has learned about a number of factors. Composite 180 creation and provisioning may be a function of pattern data 216 specific to one or a combination of location, geo-specific viewership, learning about the viewer and correlated viewership metrics, devices used, personal viewership, demographic viewership, social viewership, learned betting behavior, types of bets, live viewership trends (who's setting recordings for events and/or tuning in), event types/categories, specific competitors, rivalries, time spent watching particular games, regular season versus post-season, upcoming events, real-time state changes based on what's actually happening in events, parameters such as odds information, other observations data 229, other data source input 212, and/or the like criteria disclosed herein. The learning engine 239 and/or the matching engine 238 may perform correlation based at least in part on correlation rules that govern correlation of the personalized pattern data 216 to content objects 177 and corresponding sources of the content objects 177 based at least in part on metrics and availabilities of the content objects 177 from the particular source systems 103. In various embodiments, the correlation may be based at least in part on the profiles of the service provider systems 103. By way of example, the correlation rules 218 may include correlation criteria that could include respective weightings assigned to the particular criteria. Hence, each type of the above criteria could be assigned a weight according to its significance. Specifications of the criteria and weightings could be implemented in any suitable manner, including lists, tables, matrices, and/or the like, and could be organized in a rank order and/or any hierarchical structure according to weight. Some embodiments may have specifications of the criteria and weightings organized according to decision tree, with contingencies so that only certain combinations of criteria may be considered. In some embodiments, the learning engine 239 and/or the matching engine 238 may employ a scoring system to quantify correlations with a numerical expression, for example, a match/watchability score, with higher scores being assigned to higher correlations. Higher scores may be assigned for greater extents of matching. Accordingly, the learning engine 239 and/or the matching engine 238 may learn a viewer's top-ranked interests in types of events, participating entities, geolocations, types of bets, odds, and/or the like observation data 229.

In accordance with the pattern data 216, the subsystem 111 may detect a trigger for composite 180 creation that corresponds to a need for presentation of one or more composites 180 in view of an upcoming event, a continuation of an ongoing event, and/or during the presentation of content corresponding to the event. Detecting a trigger may include determining timing specifications of the event that matches the viewer pattern data 216, odds information that matches the viewer pattern data 216, a temporal progression in the event (e.g., the fourth quarter, the second round, etc.) and/or shifting odds due to developments occurring within the event (e.g., underdog is actually close or ahead, an upset is imminent, etc.), detecting a state change in the event (e.g., a score change, one team or competitor leading or falling behind, etc.), and/or the like. As one example case out of many possibilities, say a state change in an event occurs (e.g., a score change, one team or competitor leading or falling behind, a takedown, a foul, etc.) and/or temporal progression benchmark (e.g., the fourth quarter, the second round, etc.) is reached. The subsystem 111 may detect the state change and, in response, initiate creation of composites 180 for presentation at an upcoming break or during the event. The composite 180 may be dynamically inserted in the content stream within a short time (e.g., substantially, seconds, within a minute, with environments, etc.) after the state change. As disclosed herein, in various embodiments, the subsystem 111 may detect the state change and other triggers by way of analyzing and consolidating data source input 212 (e.g., data feeds and/or event updates) received from various data sources 112, particularized content objects 177 from systems 103, and/or analysis of content 202 by keyword recognition of a dialogue from an announcer (e.g., detecting words such as touchdown, goal, takedown, foul, minutes on the clock, etc.), sudden changes in crowd noise, and/or image recognition (e.g., detecting graphics displayed with a televised event such as a scoreboard, streaming tickers or overlays typically positioned and/or scrolling across a portion of the display area, etc.).

When the subsystem 111 detects a trigger, the subsystem 111 may receive, pull, and/or select one or more content objects 177 from a process-performing system 103, and may receive, pull, and/or select from one or more adaptable content objects 176 provided by the system 102 as matching particular segments of the event and the one or more content objects 177 to generate and output for display, utilizing the content composite splicing engine 242, one or more composites 180 to display as a commercial during a programming break after a particular segment or as an intra-program overlay, frame, window, pop-up, and/or the like presented concurrently with the event.

Figure 5:
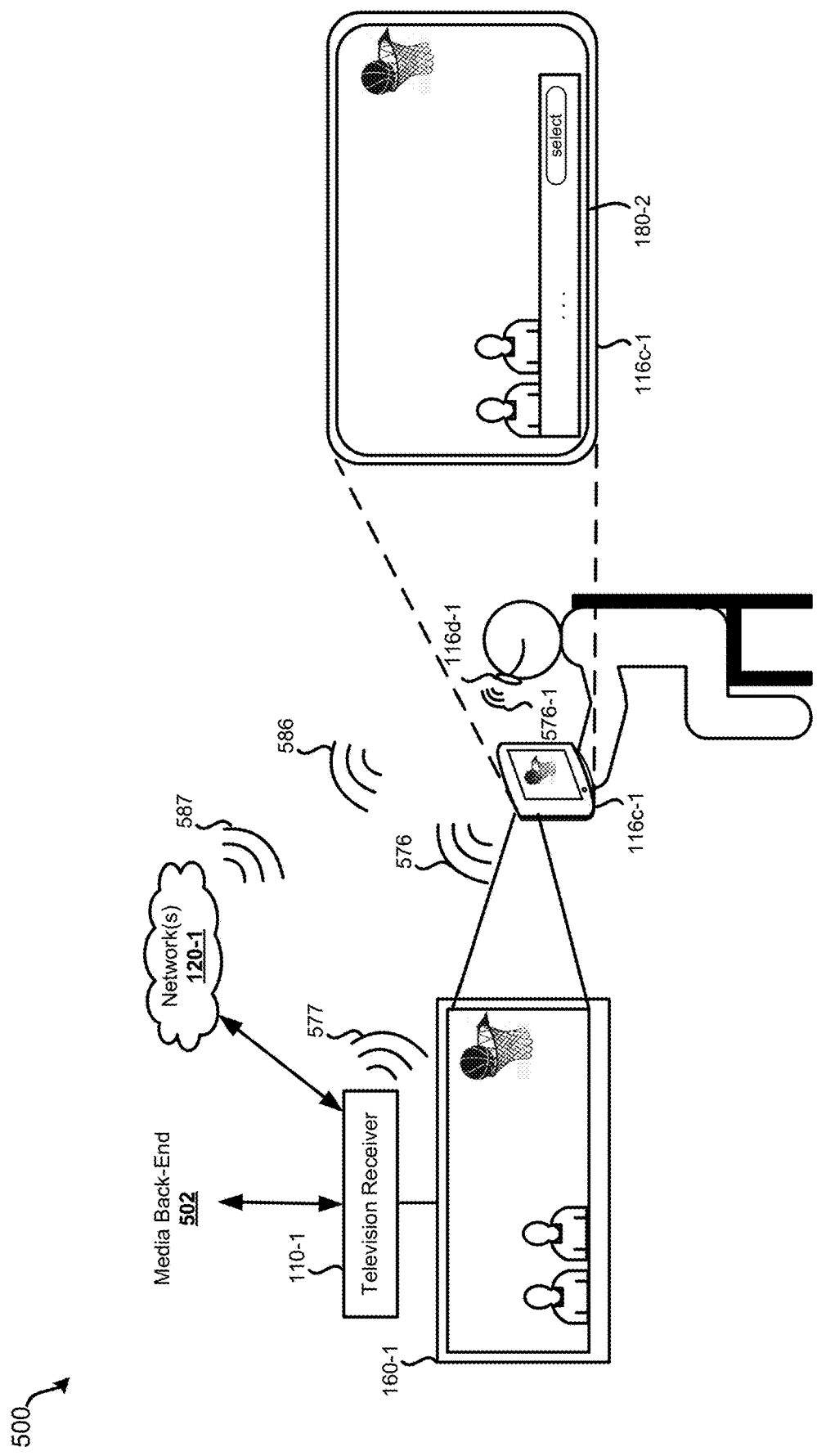
FIG. 5 illustrates a content composite interaction subsystem, in accordance with disclosed embodiments per the present disclosure.

FIG. 5 is a simplified illustration of a content composite interaction subsystem 500, in accordance with certain embodiments of the present disclosure. The interaction subsystem 500 may include the television receiver 110-1. The interaction subsystem 500 may include a display device 160-1 communicatively coupled with the television receiver 110-1. The television receiver 110-1 may be communicatively coupled with a media service back-end 502, which may correspond to certain upstream elements of FIG. 1 and may include the network 120-1. The interaction subsystem 500 may include any one or combination of computing devices 116*a-d*. Depicted are two examples of a computing device 116*c* and a computing device 116*d*. Though both examples are depicted, a user may only use one computing device 116 in certain use cases. A number of other examples are possible, but not shown. In some embodiments, the display 160-1 and/or the television receiver 110-1 may be controlled by the user using the computing device 116 to send wireless signals 576 to communicate with the television receiver device 110-1 and/or the display 160-1. The computing device 116 may receive wireless signals 577 from the television receiver device 110-1 to effectuate bi-directional communication. The computing device 116 may further receive and send wireless signals 586, 587 from the network 120 through various means such as a Wi-Fi router, modem, cellular access points, and/or the like.

For example, a content object 177 may include text, one or more images, links, URLs, buttons, other user interface elements, and/or the like which the content splicing engine 242 may aggregate, process, format, crop, rescale, and/or otherwise prepare and include in composites 180 for insertion into the content stream for output with the programming content 202 and/or during breaks of the programming content 202. By way of example, a content composite 180 may include a combination of graphics, video, audio, and/or one or more links along with the message such as: "The Buffs are up 38-36 at halftime—check out the latest odds," "KU is up 42-40, place a bet on the second half of the game," or "Think Denver can come back? The current odds are 7:1." Thus, the content composite splicing engine 242 may identify content portions for augmentation by processing the content object 177, reading the object 177 or certain portions thereof, and determine portions for augmentation in video segments. In some embodiments, portions of images and/or frames of the adaptable content object 176 may be overwritten with captured content from the content object 177.

Referring again more particularly to FIG. 2, the matching engine 238 may be configured to match adaptable content objects 176 to objects 177 and segments of programming content 202 based at least in part on metadata at a service provider system 102 side or at a television receiver 110 and/or device 116, in accordance with various embodiments. For example, metadata may be extracted when or before a given segment of programming content 202 is to be output for display and before a transition point. In some embodiments, the matching engine 238 may read the metadata and perform a search of the repositories 222 for one or more adaptable content objects 176 that have metadata matching the extracted metadata with respect to one or more of event identification, event category identification, and/or temporal identification, with the highest preference given to the adaptable content object 176 that has metadata most closely matching the metadata of the previous segment. Alternatively, the matching engine 238 may read the metadata mapped to the segment and pull one or more adaptable content objects 176 from the service provider system 102. In so doing, the subsystem 111 may transmit at least a portion of the metadata of the objects 177 and/or programming content 202 to the service provider system 102 in order to facilitate matching the extracted metadata with one or more adaptable content objects 176 with respect to one or more of event identification, event category identification, and/or temporal identification. Consequently, the service provider system 102 may transmit one or more matching adaptable content objects 176 to the subsystem 111, which may be integrated with a receiver 110 and/or device 116. Some embodiments may include the subsystem 111 configured to perform a search of the repositories 222 for one or more adaptable content objects 176 that have metadata matching the extracted metadata in addition to pulling one or more adaptable content objects 176 from the service provider system 102. For example, the subsystem 111 may first perform a search of the repositories 222 for any matching adaptable content objects 176 and then only pull one or more adaptable content objects 176 from the service provider system 102 when no adaptable content objects 176 are found in the search of the repositories 222 that match the extracted metadata with a sufficient match score that indicates a level of correlation satisfying a correlation threshold.

Additionally or alternatively, the matching engine 238 may pull one or more content objects 177 from the service provider system 102 and/or one or more service provider systems 103 based at least in part on particulars detected with the trigger. In so doing, the subsystem 111 may transmit at least a portion of metadata of the trigger and/or the programming content 202 to the service provider system 102 and/or one or more service provider systems 103 in order to facilitate matching the extracted metadata with one or more content objects 177 with respect to one or more of event identification, event category identification, and/or temporal identification. Consequently, the service provider system 102 and/or one or more service provider systems 103 may transmit one or more matching content objects 177 to the subsystem 111. Additionally or alternatively, in some embodiments, the subsystem 111 first obtain one or more matching adaptable content objects 176, then read metadata from the one or more matching adaptable content objects 176, and transmit at least a portion of the metadata to the service provider system 102 and/or one or more service provider systems 103 in order to facilitate matching the metadata with one or more content objects 177.

In determining whether to initiate and/or the restrictions governing the creation and/or provisioning of content composites 180, the subsystem 111 may detect a location corresponding to the computing device 116 and the receiver 111 and may determine from rules 218 whether the provisioning of content composites 180 of certain type are prohibited for the location. In the case where the subsystem 111 determines that there is no prohibition for the location, the subsystem 111 may determine a set of the rules 218 that govern timing restrictions and specifications, event type restrictions and specifications, place and manner restrictions and specifications, and types of adaptations of the adaptable content objects 176 with the particularized content objects 177 to create the composites 180. Various sets of rules 218 may provide for various types of adaptations of the adaptable content objects 176 with the particularized content objects 177, and the subsystem 111 may determine which set of rules 218 apply to a given receiver 110 and/or device 116 as a function of the location of the receiver 110 and/or device 116.

The place and manner restrictions and specifications of the geo-specific rules 218 may govern how composites are provisioned with respect to programming content 202 (e.g., as a commercial, as a real-time pop-up, as a real-time overlay, as an inset frame, and/or like), which may be a function of the type of event and/or the type of end-user device. For example, a set of rules 218 may specify that composites 180 may only be provided during commercial breaks of televised event. Another set of rules 218 may specify that composites 180 may be provided as overlays, frames, and/or pop-ups during the televised event. In such cases, the rules 218 may require the user opt in and request such overlays, frames, and/or pop-ups during presentation of the televised event. Accordingly, one or more user-selectable options may be presented to the user via the receiver 110 and/or device 116 to allow request overlays, frames, and/or pop-ups during presentation of the televised event. Such user-selectable options may be provided with composites 180 that are presented and during commercial breaks. Thus, contingent upon user selection of the options, presentation of composites 180 may transition to overlays, frames, and/or pop-ups during presentation of the televised event. Likewise, one or more user-selectable options may be presented to the user via the receiver 110 and/or device 116 to prohibit content composite 180 provisioning. Upon user selection of such prohibition, the subsystem 111 may present alternative content objects in lieu of content composites 180 during commercial breaks.

In like manner, one or more user-selectable options may be presented to the user via the receiver 110 and/or device 116 to allow content composite 180 provisioning to a secondary device 116 concurrently with the presentation of the televised event. Such provisioning to a secondary device 116 may be provided by way of one or combination of application installed on the secondary device 116, communications from the receiver 110, communications from the service provider system 102, a near field communication interface (e.g., contactless interface, Bluetooth, optical interface, etc.), wireless communications interfaces capable of communicating through a cellular data network, or through Wi-Fi, such as with a wireless local area network (WLAN), and/or the network 120. By way of example, a composite 180 may be presented via a television receiver 110 on a display 160 with one or more user-selectable options that allow redirection of composites 180 to a secondary device 116 consequent to user selection. The redirection of composites 180 to the secondary device 116 may include options to cast the televised event from the receiver 110 to the secondary device 116 and/or the composites 180. To facilitate such a mode of operation, various embodiments may include the receiver 110 and/or the device 116 incorporating at least portions of the subsystem 111 provide various features.

According to one option, the secondary device 116 (e.g., device 116c or 116d as illustrated in FIG. 5) may receive the same content, including composites 180 as commercial segments and/or overlays, being displayed on the display device 160 with simulcasting to the secondary device 116 so that the secondary device 116 need only display the augmented content. According to another option, the television receiver 110 may provide the programming content to the display device 160, and the secondary device 116 may receive the programming content and splice composites 180 into the content displayed with the device 116. In various embodiments, the device 116 may receive the composites 180 for composite generation/control from the receiver 110, may receive the composites 180 for composite generation/control from the service provider system 102, and/or may receive adaptable content objects 176 and content objects 177 from the receiver 110 and/or the system 102 in order that the device 116 may create and provision composites 180 therefrom. In some modes of operation, the television receiver 110 may present alternative content objects with the display device 160 in lieu of content composites 180, while the content composites may be shunted to the secondary device 116. Thus, the secondary device 116 may receive composites 180 that would otherwise be displayed on the display device 160. In some embodiments and options, the receiver 110 may not cast to the televised event, but the device 116 may present composites 180 without the televised event. For example, according to some options, an application for the device 116 may be downloaded, installed, and initiated to facilitate content provisioning on the device 116 and interaction with one or a combination of the receiver 110, system 102, and/or one or more systems 103. Accordingly, various embodiments may provide various user-selectable options for transitioning from just viewing a televised event to displaying and interacting with composites 180 and service provider systems 103 via a secondary device 116, while a televised event corresponding to the composites 180 is being displayed on another device such as display device 160 the receiver 110.

The user-selectable options presented with the composite 180 may allow for taking actions, such as selecting one or more URLs and/or hyperlinks to one or more betting platforms, websites, and/or sites for further information and placing bets. As disclosed herein, the user-selectable options may include one or more options to transition provisioning of one or more composites 180 to a secondary device 116 and/or to request notifications from the one or more betting platforms, websites, and/or sites be sent to the secondary device 116 so that the secondary device 116 may be used to interact with the platforms and sites via an application installed on the secondary device 116. In that way, a user may place bets and otherwise interact with the one or more platforms and sites via the secondary device 116 while viewing the televised event on a primary display associated with a receiver 110 and/or primary device 116.

As disclosed herein, various embodiments may provide for an interface (augmentation interface) that facilitates the adaptive content composite interaction that is jurisdiction-smart, geo-adaptable, and jurisdiction-adaptable. In combination with other features disclosed herein, various embodiments may differentiate what features are available for a location and jurisdiction and then provide only those features that are available/allowed. Further, the features and recommendations provided by various embodiments may be a function of access rights of particular viewers. The interfaces of various embodiments may orchestrate the services of different systems 103, biasing content composites 180 and announcements to particular viewers, surfacing available content composites 180 and executable functions from the systems 103, while providing comparisons of the various corresponding options and parameters. In various embodiments, the augmentation interface may be similar to or different from interface elements disclosed with the example of FIG. 5 and in U.S. application Ser. No. 17/505,135, which application is filed concurrently herewith and is hereby incorporated by reference in its entirety for all purposes.

Figure 8:
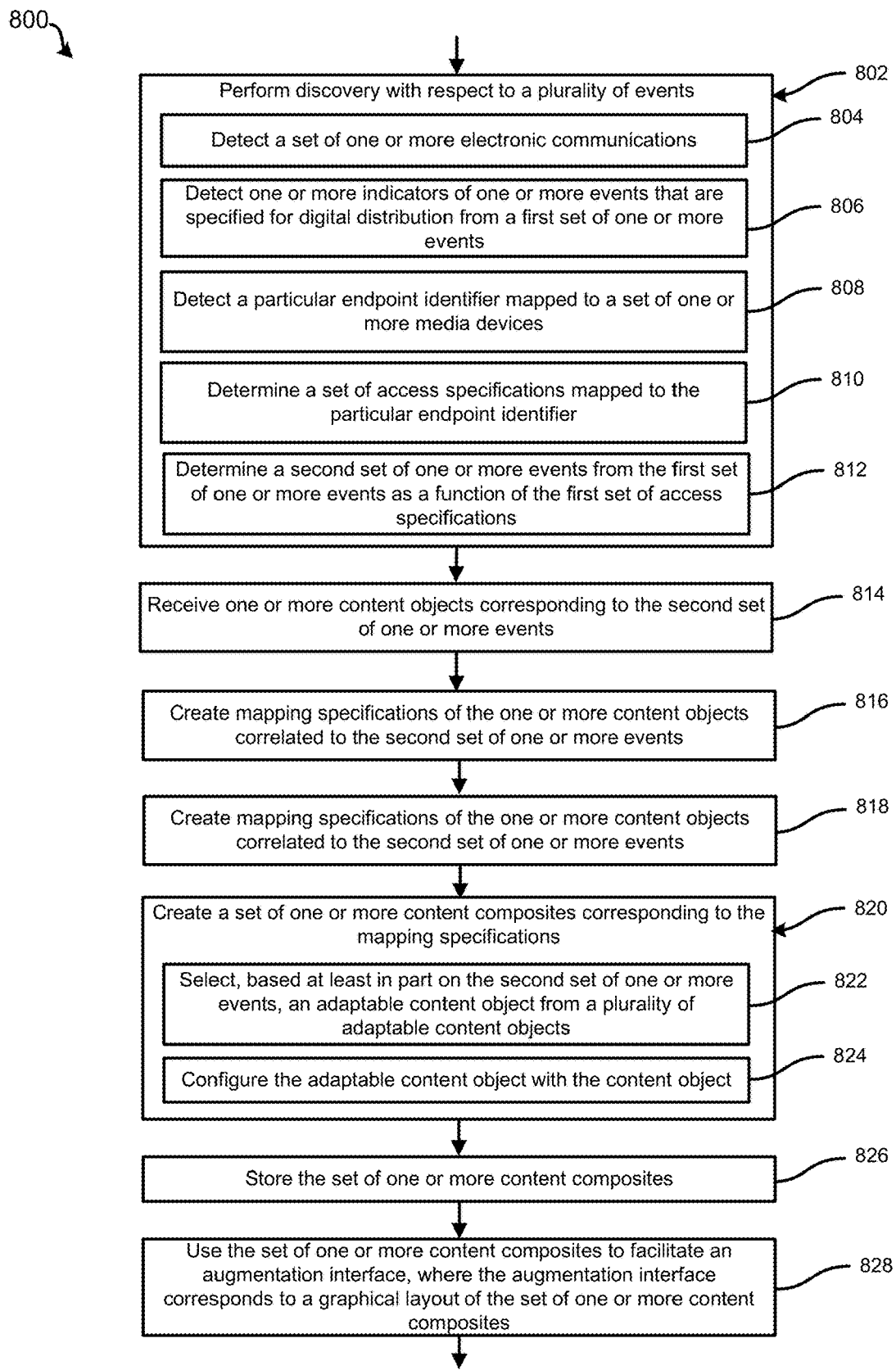
FIG. 8 illustrates example method for adaptive content composite interaction with respect to digitally distributed content corresponding to an event, in accordance with disclosed embodiments per the present disclosure.

FIG. 8 illustrates an example method 800 for adaptive content composite interaction with respect to digitally distributed content corresponding to an event, in accordance with embodiments of the present disclosure. One or a combination of the aspects of the method 800 may be performed in conjunction with one or more other aspects disclosed herein, and the method 800 is to be interpreted in view of other features disclosed herein and may be combined with one or more of such features in various embodiments. Thus, in various embodiments, one or more of the methods may additionally or alternatively include one or a combination of the following.

As indicated by block 802, in various embodiments, one or more processing devices of one or more media devices may perform discovery with respect to a plurality of events at least in part by one or a combination of the following operations, which are disclosed further herein. As indicated by block 804, a set of one or more electronic communications may be received via one or more interfaces and detected. As indicated by block 806, one or more indicators of one or more events of a first set of one or more events for which corresponding content is specified for digital distribution may be detected from the one or more sets of one or more electronic communications. As indicated by block 808, the one or more processing devices may detect a particular endpoint identifier mapped to a set of one or more media devices 110 and/or 116. As indicated by block 810, a set of access specifications mapped to the particular endpoint identifier may be determined. In some embodiments, the set of access specifications may be further determined to be mapped to the set of one or more media devices 110 and/or 116. As indicated by block 812, a second set of one or more events may be determined from the first set of one or more events as a function of the first set of access specifications. In some instances, the second set may be a subset of the first set; in some instances, the second set may include or be equivalent to the first set.

As indicated by blocks 816, the one or more processing devices may receive, from a remote system 102 or 103 via a network 120, one or more content objects 177 corresponding to the second set of one or more events. As indicated by blocks 816, the one or more processing devices may create mapping specifications of the one or more content objects 177 correlated to the second set of one or more events and the first set of access specifications. For example, a first set of one or more content objects 177 received by the one or more processing devices from the remote system 102 or 103 may be processed, and a second set of one or more content objects 177 from the first set of one or more content objects 177 may be identified as a function of the one or more rules mapped to the current geolocation. As indicated by blocks 818, 820, and 822, the one or more processing devices may create a set of one or more content composites 180 corresponding to the mapping specifications at least in part by, for each content object 177 of the second set of one or more content objects 177: selecting, based at least in part on the second set of one or more events, an adaptable content object 176 from a plurality of adaptable content objects 176; and configuring the adaptable content object 176 with the content object 177 to form a content composite 180 configured to facilitate presentation of the adaptable content object 176 adapted with the content object 177 for at least part of a presentation time when the content composite 180 is presented. As indicated by block 824, the set of one or more content composites 180 may be stored. As indicated by block 826, the set of one or more content composites 180 may be used to facilitate an augmentation interface. The augmentation interface may correspond to a graphical layout of the set of one or more content composites 180, where each content composite 180 causes display of an interface element that allows user selection to cause communication to the process-performing system 103 of an instruction to configure an executable function in accordance with a set of parameters. Where the set of one or more content composites 180 corresponds to a plurality of content composites 180, and the graphical layout of the plurality of content composites 180 may hierarchically arrange the plurality of content composites 180 according to one or more parameters of the executable functions of the plurality of content composites 180. For example, in various embodiments, the augmentation interface may organize betting options for various events from various systems 103 by best odds, over under numbers, and/or the like. This could include bets placed, pending and completed, won and lost, current event developments for the corresponding events, as well as options for further selection. Further, the interface may indicate events which the viewer does not currently have access to but could upgrade access rights with a single click.

In some embodiments, the creating the content composite 180 and/or the adaptation of the one or more content objects 176 with one or more particular objects 177 may be a function of a current geolocation of the endpoint media device 116 or 110, with a set of rules mapped to the current geolocation and specifying geo-specific criteria for creating content composites 180, selecting content objects 176 and particularized content objects 177, adapting the content objects 176 with particularized content objects 177, and provisioning the content objects 176 and particularized content objects 177. Thus, in various embodiments, the one or more processing devices may detect a current geolocation of a particular media device 110 and/or 116 of the set of one or more media devices 110 and/or 116, as disclosed further herein. The one or more processing devices may retrieve one or more rules mapped to the current geolocation of the particular media device 110 and/or 116. The current geolocation of the media device may be determined at a time when the content corresponding to the event is being output for display and/or prior to being output for display. With the content composite 180 created and, in some instances, the one or more content objects 176 adapted, the one or more content objects 176 corresponding to the content may be output for display (during a commercial break and/or during the event as a window, overlay, etc.), where the content objects 176 and particularized content objects 177 are selected based at least in part on location metadata mapped to the content objects 176 and particularized content objects 177 specifying location indicia for the content objects 176 and particularized content objects 177.

Figure 9:
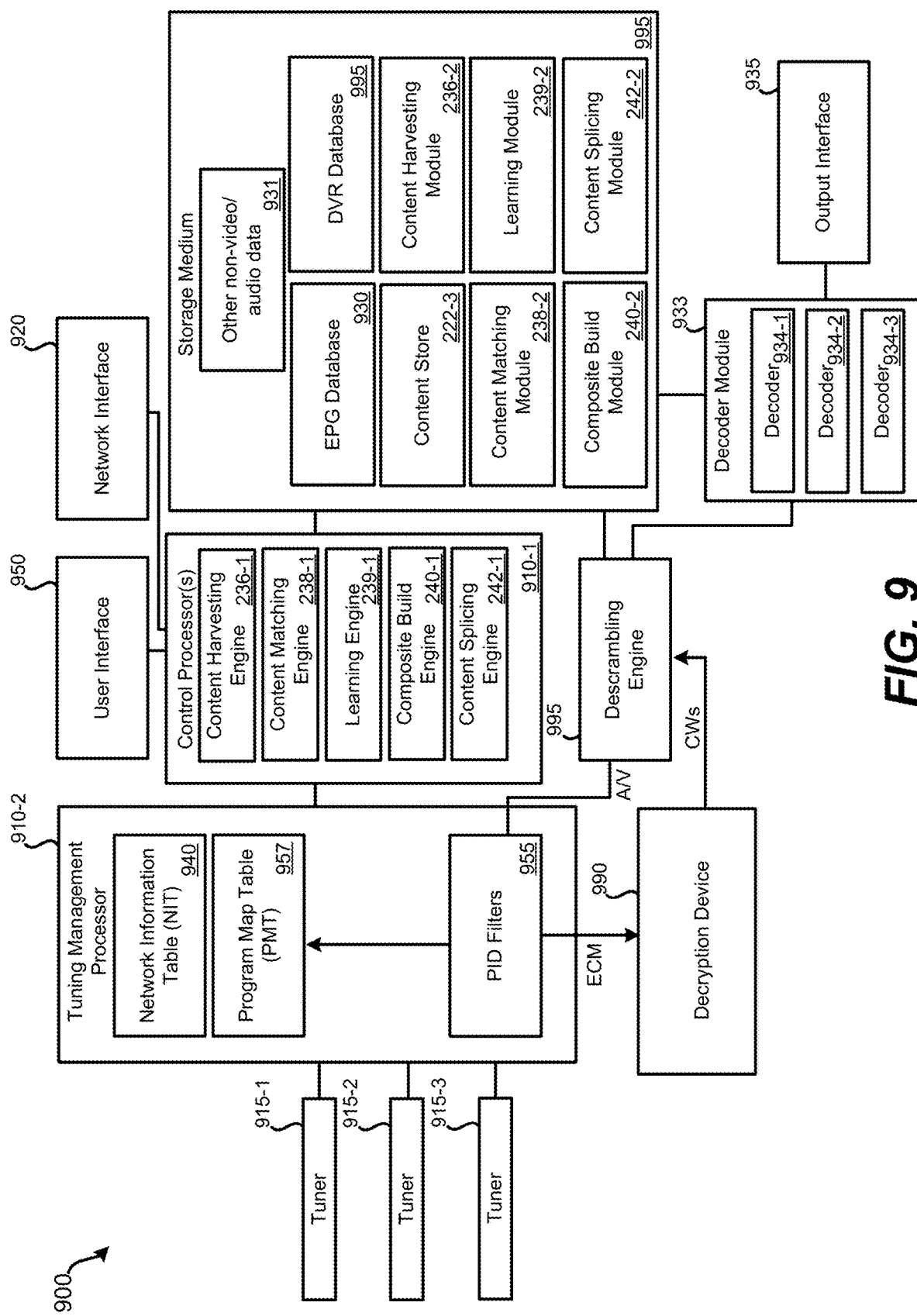
FIG. 9 illustrates a receiver that makes use of, interacts with, and/or at least partially includes the content composite generation/control system, in accordance with disclosed embodiments per the present disclosure.

FIG. 9 illustrates a receiver 900 that makes use of, interacts with, and/or at least partially includes the content composite generation/control system 200, in accordance with disclosed embodiments of the present disclosure. Certain embodiments of the receiver 900 may include set top boxes (STBs), television receivers, and over-the-top receivers. In some embodiments, the receiver 900 may correspond to the television receiver 110. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). One or a combination of the content harvesting engine 236-1, the content matching engine 238-1, learning engine 239-1, composite build engine 240-1, and/or content splicing engine 242-1 may be provided in conjunction with content harvesting module 236-2, the content matching module 238-2, composite build module 240-2, and/or content composite splicing module 242-2 to implement various functionalities of the content composite subsystem 111 into the receiver 900.

The receiver 900 may represent receiver 110 of FIG. 1 and may be in the form of a STB that communicates with a display device such as a television. The receiver 900 may be incorporated as part of a television, such as the display device 160 of FIG. 1 or television 900 of FIG. 9, etc. The receiver 900 may include: processors 910 (which may include control processor 910-1, tuning management processor 910-2, and possibly additional processors), tuners 915, network interface 920, non-transitory computer-readable storage medium 925, electronic programming guide (EPG) database 930, networking information table (NIT) 940, digital video recorder (DVR) database 945, on-demand programming 927, content store 222-3, user interface 950, decryption device 960, decoder module 933, interface 935, and/or descrambling engine 965. In other embodiments of receiver 900, fewer or greater numbers of components may be present. It should be understood that the various components of receiver 900 may be implemented using hardware, firmware, software, and/or some combination thereof. Functionality of components may be combined; for example, functions of descrambling engine 965 may be performed by tuning management processor 910-2. Further, functionality of components may be spread among additional components; for example, PID filters 955 may be handled by separate hardware from program map table 957. The receiver 900 may be in data communication with service providers, such as by way of network interface 920.

The network interface 920 may be used to communicate via an alternate communication channel with a content provider, if such communication channel is available. The primary communication channel may be via satellite (which may be unidirectional to the receiver 900) and the alternate communication channel (which may be bidirectional) may be via a network, such as the Internet. Referring back to FIG. 1, receiver 110 may be able to communicate with content provider system 102 via a network 120, such as the Internet. This communication may be bidirectional: data may be transmitted from the receiver 110 to the content provider system 102 and from the content provider system 102 to the receiver 110. Referring back to FIG. 9, the network interface 920 may be configured to communicate via one or more networks, such as the Internet, to communicate with content provider system 102 of FIG. 1. Other information may be transmitted and/or received via the network interface 920 such as adaptable content objects 176, content objects 177, composites 180, metadata, and/or the like as disclosed herein.

The storage medium 925 may represent one or more non-transitory computer-readable storage mediums. The storage medium 925 may include memory and/or a hard drive. The storage medium 925 may store information related to the EPG database 930, augmentation module 932 and related preferences, other non-video/audio data 931, DVR database 945, the other modules, and/or the like. Recorded television programs may be stored using the storage medium 925 as part of the DVR database 945.

The EPG database 930 may store information related to television channels and the timing of programs appearing on such television channels. The EPG database 930 may be stored using the storage medium 925, which may be a hard drive. Information from the EPG database 930 may be used to inform users of what television channels or programs are popular and/or provide recommendations to the user. Information from the EPG database 930 may provide the user with a visual interface displayed by a television that allows a user to browse and select television channels and/or television programs for viewing and/or recording. Information used to populate the EPG database 930 may be received via the network interface 920 and/or via satellites, such as the satellite 106 of FIG. 1 via the tuners 915. For instance, updates to the EPG database 930 may be received periodically via satellite. The EPG database 930 may serve as an interface for a user to control DVR functions of the receiver 900, and/or to enable viewing and/or recording of multiple television channels simultaneously. Information from EPG database 930 may be output as a video stream to a display device. A particular user may issue commands indicating that an EPG interface be presented. A user issuing a command that an EPG be displayed may constitute a change command. In some embodiments, content composites 180 may be created and presented in conjunction with the EPG. For example, content composites 180 could pertain to televised events indicated in the EPG. Hence, content composite 180 features may extend to EPG views in some embodiments.

The television interface 935 may serve to output a signal to a television (or another form of display device) in a proper format for display of video and playback of audio. As such, the television interface 935 may output one or more television channels, stored television programming from the storage medium 925 (e.g., television programs from the DVR database 945, information from the EPG database 930, etc.) to a television for presentation.

User profiles may also be stored in the storage medium 945 and may include stored user preferences that may be inferred by the television receiver 900 based at least in part on viewing history. The television receiver 900 may communicate user profile information to the service system(s) 102, 103 to request adaptable content objects 176 and content objects 177 tailored to the inferred user preferences to provision composites 180 in accordance with certain embodiments disclosed herein. The user profiles may include profiles for multiple users or may include a single profile for the television receiver in general. In some embodiments, the user profiles may include preferences for customized content presentation adjustments disclosed herein. The user profiles may further include user feedback, via user-selectable options, received from the user regarding customizations. The feedback data may be used to refine the customizations for particular viewers and types of content customizations.

The user interface 950 may include a remote control (physically separate from the receiver 900) and/or one or more buttons on the receiver 900 that allow a user to interact with the receiver 900. The user interface 950 may be used to select a television channel for viewing, view information from the EPG database 930, and/or program a timer stored to DVR database 945, wherein the timer is used to control the DVR functionality of the control processor 910-1. The user interface 950 may also be used to transmit commands to the receiver 900 and make user selections to customize user preferences.

For simplicity, the receiver 900 of FIG. 9 has been reduced to a block diagram; commonly known parts, such as a power supply, have been omitted. Further, some routing between the various modules of the receiver 900 has been illustrated. Such illustrations are for exemplary purposes only. The state of two modules not being directly or indirectly connected does not indicate the modules cannot communicate. Rather, connections between modules of the receiver 900 are intended only to indicate possible common data routing. It should be understood that the modules of the receiver 900 may be combined into a fewer number of modules or divided into a greater number of modules.

Further, the components of the television receiver 900 may be part of another device, such as built into a television. The television receiver 900 may include one or more instances of various computerized components, such as disclosed in relation to computer systems disclosed further herein. While the television receiver 900 has been illustrated as a satellite receiver, it is to be appreciated that techniques below may be implemented in other types of television receiving devices, such as cable receivers, terrestrial receivers, IPTV receivers or the like. In some embodiments, the television receiver 900 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 10:
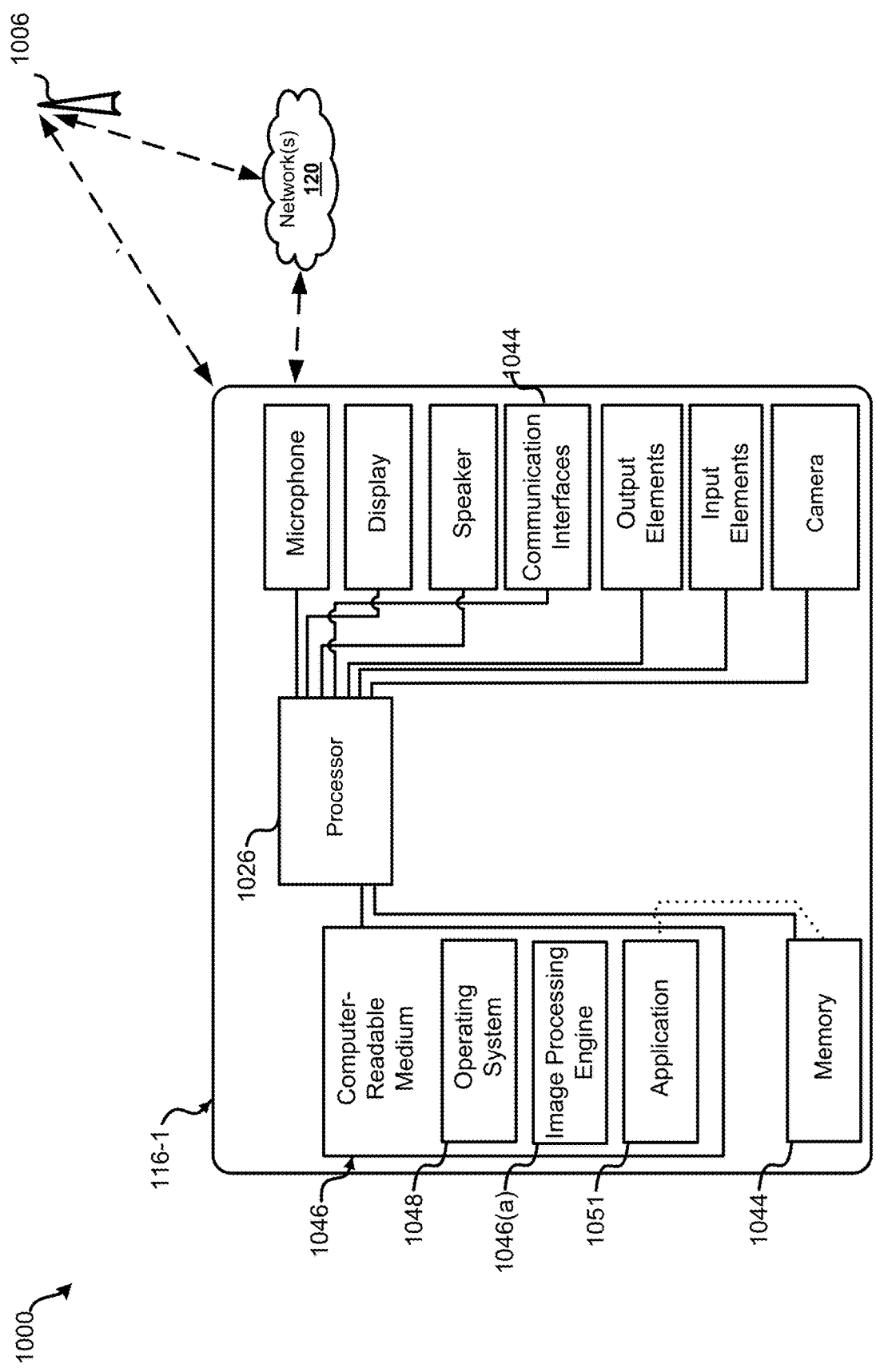
FIG. 10 illustrates a system including one non-limiting example of a computing device configured to facilitate adaptive content composite generation/control, in accordance with disclosed embodiments of the present disclosure.

FIG. 10 is a block diagram of a system 1000 including one non-limiting example of a computing device 116 configured to facilitate adaptive content composite generation/control, in accordance with disclosed embodiments of the present disclosure. The computing device 116 may be a portable device suitable for sending and receiving information to/from the receiver 110 and over a network to/from remote data sources (e.g., service providers 103 and online content sources 112) in accordance with embodiments described herein. For example, in various embodiments, the computing device 116 may correspond to one or more of computing devices 116a, 106b, 116c, 116d depicted in FIG. 1.

In some embodiments, the computing device 116 may be provided with an application 1051, which may, in some embodiments, correspond to a mobile application configured to run on the computing device 116 to facilitate various embodiments of this disclosure. For example without limitation, the mobile application 1051 may transform the computing device 116 into an adaptive content composite generation/control device to facilitate features of various embodiments disclosed herein. In various embodiments, the mobile application 1051 may allow the device 116 to be configured to provide one or a combination of the content harvesting engine 236-1, the content matching engine 238-1, learning engine 239-1, content augmentation engine 240-1, and/or content composite splicing engine 242-1 may be provided in conjunction with the content harvesting module 236-2, the content matching module 238-2, content augmentation module 240-2, and/or content composite generation/control module 242-2 to implement various functionalities of the content composite subsystem 111 into the device 116.

In various embodiments, the application 1051 can be any suitable computer program that can be installed and run on the computing device 116, and, in some embodiments, the application 1051 may not be a mobile app but may be another type of application, set of applications, and/or other executable code configured to facilitate embodiments disclosed herein. The application 1051 may be provided in any suitable way. For non-limiting example, the application 1051 may be made available from a website, an application store, the service provider 102, etc. for download to the computing device 116; alternatively, it may be pre-installed on the computing device 116.

In various embodiments, the computing device 116 configured with the application 1051 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 10, the computing device 116 includes a display 1020 and input elements 1032 to allow a user to input information into the computing device 116. By way of example without limitation, the input elements 1032 may include one or more of a keypad, a trackball, a touchscreen, a touchpad, a pointing device, a microphone, a voice recognition device, or any other appropriate mechanism for the user to provide input.

In various embodiments, the computing device 116 may pull content objects 176, content objects 177, and/or composites 180 from the receiver 110 and/or from systems 102 and/or 103 via the network 120 in order to provide the content composites 180 to a user of the computing device 116 through the application 1051. The application 1051 can include a utility that communicates with the receiver 110 and/or from online data sources via the network 120 to control downloading, displaying, caching, and/or other operations concerning the handling of content objects 176, content objects 177, and/or composites 180. The application 1051 and the computing device 116 may cooperate with the receiver 110 to facilitate tracking of (and customizations of user profiles and other features disclosed herein based at least in part on) user selections in response to content objects displayed through the one or more additional applications.

The user selection of a user-selectable option corresponding to the application 1051 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the computing device 116.

The computing device 116 includes a memory 1034 communicatively coupled to a processor 1036 (e.g., a microprocessor) for processing the functions of the computing device 116. The computing device 116 may include at least one antenna for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The computing device 116 may also include a microphone to allow a user to transmit voice communication through the computing device 116, and a speaker to allow the user to hear voice communication. The antenna may include a cellular antenna (e.g., for sending and receiving cellular voice and data communication, such as through a network such as a 3G, 4G, or 5G network). In addition, the computing device 116 may include one or more interfaces in addition to the antenna, e.g., a wireless interface coupled to an antenna.

The communications interfaces 1044 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the computing device 116 may be capable of transmitting and receiving information wirelessly through both short range, radio frequency (RF), cellular, and Wi-Fi connections. The computing device 116 may access the network 108 through a wireless link to an access point. For example, a computing device 116 may access the network 108 through one or more access points 1006. The access points 1006 may be of any suitable type or types. For example, an access point 1006 may be a cellular base station, an access point for wireless local area network (e.g., a Wi-Fi access point), an access point for wireless personal area network (e.g., a Bluetooth access point), etc. The access point 1006 may connect the computing device 116 to the network 108, which may include the Internet, an intranet, a local area network, private communication networks, etc. In some embodiments, the communications interfaces may allow computing device 116 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

The computing device 116 can also include at least one computer-readable medium 1046 coupled to the processor 1036, which stores application programs and other computer code instructions for operating the device, such as an operating system (OS) 1048. In some embodiments, the application 1051 may be stored in the memory 1034 and/or computer-readable media 1046. Again, the example of computing device 116 is non-limiting. Other devices, such as those disclosed herein, may be used.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer systems disclosed herein, various computer-readable media might be involved in providing instructions/code to processor(s) for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s). Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) for execution. Merely by way of example, the instructions may initially be carried on a magnetic disk and/or optical disc of a remote computer. A remote computer might load the instructions into its dynamic memory and send the instructions as signals over a communication medium to be received and/or executed by the computer system. The communications subsystems of computer systems disclosed herein (and/or components thereof) generally will receive signals, and the bus then might carry the signals (and/or the data, instructions, etc. carried by the signals) to the working memory, from which the processor(s) retrieves and executes the instructions. The instructions received by the working memory may optionally be stored on a non-transitory storage device either before or after execution by the processor(s).

It should further be understood that the components of computer systems can be distributed across a network. For example, some processing may be performed in one location using a first processor while other processing may be performed by another processor remote from the first processor. Other components of computer systems may be similarly distributed. As such, the computer systems may be interpreted as a distributed computing system that performs processing in multiple locations. In some instances, computer systems may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate adaptive content composite generation with respect to digitally distributed content corresponding to an event, the system comprising:
   one or more processing devices; and
   memory communicatively coupled with and readable by the one or more processing devices and having stored therein processor-readable instructions which, when executed by the one or more processing devices, cause the one or more processing devices to perform:
- detecting a set of one or more electronic communications received via one or more interfaces;
- detecting, from the set of one or more electronic communications, one or more signals of one or more events that are specified for digital distribution from a set of one or more events;
- processing a set of viewership data corresponding to indications of detected media device operations associated with a set of media devices in a particular geolocation and mapped to the set of one or more events, wherein the viewership data is aggregated data from the set of media devices and is indicative of viewership corresponding to a plurality of viewers in the particular geolocation;
- predicting a viewership of a particular event based at least in part on the set of viewership data of the set of one or more events and of betting odds data mapped to the set of one or more events and received from one or more remote systems;
- selecting an identifier of the particular event;
- creating a content composite corresponding to the particular event, as a function of the predicted viewership and one or more previous interactions of a viewer with one or more previous content composites, at least in part by:
  - identifying, based at least in part on the set of viewership data correlated to feedback data relating the one or more previous interactions of the viewer with the one or more previous content composites, an adaptable content object corresponding to the particular event;
  - processing a content object received by the one or more processing devices from a system that is remote from the one or more processing devices;
  - configuring the adaptable content object with the content object so that the content composite causes presentation of the adaptable content object adapted with the content object for at least part of a presentation time when the content composite is presented; and
  - outputting the content composite for presentation where, consequent to providing the content composite to an endpoint media device, the endpoint media device performs at least one operation relating to the content composite.

2. The system to facilitate adaptive content composite generation with respect to digitally distributed content corresponding to an event as recited in claim 1, where the indications of the detected media device operations are associated with a particular endpoint identifier.

3. The system to facilitate adaptive content composite generation with respect to digitally distributed content corresponding to an event as recited in claim 2, where the detected media device operations comprise one or more previous interactions with one or more previous content composites.

4. The system to facilitate adaptive content composite generation with respect to digitally distributed content corresponding to an event as recited in claim 2, where the detected media device operations comprise one or more previous operational settings of the endpoint media device.

5. The system to facilitate adaptive content composite generation with respect to digitally distributed content corresponding to an event as recited in claim 2, where the creating the content composite is a function of a current geolocation of the endpoint media device and a set of rules mapped to the current geolocation.

6. The system to facilitate adaptive content composite generation with respect to digitally distributed content corresponding to an event as recited in claim 5, where one or both of the adaptable content object and the content object are identified as a function of the current geolocation mapped to the endpoint media device associated with the particular endpoint identifier.

7. A method for adaptive content composite generation with respect to digitally distributed content corresponding to an event, the method comprising:
- detecting, by one or more processing devices, a set of one or more electronic communications received via one or more interfaces;
- detecting, by the one or more processing devices from the set of one or more electronic communications, one or more signals of one or more events that are specified for digital distribution from a set of one or more events;
- processing, by the one or more processing devices, a set of viewership data corresponding to indications of detected media device operations associated with a set of media devices in a particular geolocation and mapped to the set of one or more events, wherein the viewership data is aggregated data from the set of media devices and is indicative of viewership corresponding to a plurality of viewers in the particular geolocation;
- predicting a viewership of a particular event based at least in part on the set of viewership data of the set of one or more events and of betting odds data mapped to the set of one or more events and received from one or more remote systems;
- selecting, by the one or more processing devices, an identifier of the particular event;
- creating, by the one or more processing devices, a content composite corresponding to the particular event, as a function of the predicted viewership and one or more previous interactions of a viewer with one or more previous content composites, at least in part by:
  - identifying, based at least in part on the set of viewership data correlated to feedback data relating the one or more previous interactions of the viewer with the one or more previous content composites, an adaptable content object corresponding to the particular event;
  - processing a content object received by the one or more processing devices from a system that is remote from the one or more processing devices;
  - configuring the adaptable content object with the content object so that the content composite causes presentation of the adaptable content object adapted with the content object for at least part of a presentation time when the content composite is presented; and
- outputting, by the one or more processing devices, the content composite for presentation where, consequent to providing the content composite to an endpoint media device, the endpoint media device performs at least one operation relating to the content composite.

8. The method for adaptive content composite generation with respect to digitally distributed content corresponding to an event as recited in claim 7, where the indications of the detected media device operations are associated with a particular endpoint identifier.

9. The method for adaptive content composite generation with respect to digitally distributed content corresponding to an event as recited in claim 8, where the detected media device operations comprise one or more previous interactions with one or more previous content composites.

10. The method for adaptive content composite generation with respect to digitally distributed content corresponding to an event as recited in claim 8, where the detected media device operations comprise one or more previous operational settings of the endpoint media device.

11. The method for adaptive content composite generation with respect to digitally distributed content corresponding to an event as recited in claim 8, where the creating the content composite is a function of a current geolocation of the endpoint media device and a set of rules mapped to the current geolocation.

12. The method for adaptive content composite generation with respect to digitally distributed content corresponding to an event as recited in claim 11, where one or both of the adaptable content object and the content object are identified as a function of the current geolocation mapped to the endpoint media device associated with the particular endpoint identifier.

13. One or more non-transitory, machine-readable media having machine-readable instructions thereon which, when executed by one or more processing devices, cause the one or more processing devices to perform:
   detecting a set of one or more electronic communications received via one or more interfaces;
   detecting, from the set of one or more electronic communications, one or more signals of one or more events that are specified for digital distribution from a set of one or more events;
   processing a set of viewership data corresponding to indications of detected media device operations associated with a set of media devices in a particular geolocation and mapped to the set of one or more events, wherein the viewership data is aggregated data from the set of media devices and is indicative of viewership corresponding to a plurality of viewers in the particular geolocation;
   predicting a viewership of a particular event based at least in part on the set of viewership data of the set of one or more events and of betting odds data mapped to the set of one or more events and received from one or more remote systems;
   selecting an identifier of the particular event;
   creating a content composite corresponding to the particular event, as a function of the predicted viewership and one or more previous interactions of a viewer with one or more previous content composites, at least in part by:
      identifying, based at least in part on the set of viewership data correlated to feedback data relating the one or more previous interactions of the viewer with the one or more previous content composites, an adaptable content object corresponding to the particular event;
      processing a content object received by the one or more processing devices from a system that is remote from the one or more processing devices;
      configuring the adaptable content object with the content object so that the content composite causes presentation of the adaptable content object adapted with the content object for at least part of a presentation time when the content composite is presented; and
   outputting the content composite for presentation where, consequent to providing the content composite to an endpoint media device, the endpoint media device performs at least one operation relating to the content composite.

14. The one or more non-transitory, machine-readable media as recited in claim 13, where the indications of the detected media device operations are associated with a particular endpoint identifier.

15. The one or more non-transitory, machine-readable media as recited in claim 14, where the detected media device operations comprise one or more previous interactions with one or more previous content composites.

16. The one or more non-transitory, machine-readable media as recited in claim 14, where the detected media device operations comprise one or more previous operational settings of the endpoint media device.

17. The one or more non-transitory, machine-readable media as recited in claim 14, where the creating the content composite is a function of a current geolocation of the endpoint media device and a set of rules mapped to the current geolocation.

18. The system to facilitate adaptive content composite generation with respect to digitally distributed content corresponding to an event as recited in claim 1, wherein the creating the content composite is triggered based at least in part on a viewership score correlated to the particular event and the betting odds data.

19. The system to facilitate adaptive content composite generation with respect to digitally distributed content corresponding to an event as recited in claim 1, wherein the creating the content composite is triggered based at least in part on shifting odds at least partially indicated by the betting odds data and comparing the shifting odds to the one or more previous interactions of the viewer with the one or more previous content composites.

20. The system to facilitate adaptive content composite generation with respect to digitally distributed content corresponding to an event as recited in claim 1, wherein the creating the content composite is triggered based at least in part on matching the betting odds data to viewer pattern data for the viewer.

* * * * *